(12) United States Patent
Shannon et al.

(10) Patent No.: US 12,172,307 B2
(45) Date of Patent: Dec. 24, 2024

(54) LOW-POWER HYDRAULIC VALVE, AND APPLICATIONS THEREOF IN ROBOT SYSTEMS

(71) Applicant: Sanctuary Cognitive Systems Corporation, Vancouver (CA)

(72) Inventors: Connor Richard Shannon, Vancouver (CA); Amir Farzad Forughi, Vancouver (CA); Can Ozdemir, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/396,692

(22) Filed: Dec. 26, 2023

(65) Prior Publication Data
US 2024/0208046 A1    Jun. 27, 2024

Related U.S. Application Data

(60) Provisional application No. 63/435,175, filed on Dec. 23, 2022.

(51) Int. Cl.
*F16K 11/24* (2006.01)
*B25J 9/14* (2006.01)
(Continued)

(52) U.S. Cl.
CPC ............. *B25J 9/14* (2013.01); *F15B 1/26* (2013.01); *F15B 13/0401* (2013.01);
(Continued)

(58) Field of Classification Search
CPC . B25J 9/14; B25J 9/0006; B25J 9/0003; B25J 9/02; F15B 13/0401; F15B 13/0821;
(Continued)

(56) References Cited

U.S. PATENT DOCUMENTS 4,337,797 A * 7/1982 Caruso .................. F16K 27/041
251/324
5,944,042 A * 8/1999 Takahashi ............... F16K 11/07
251/282
(Continued)

FOREIGN PATENT DOCUMENTS

DE    102014201604 A1    7/2015
JP         5177937 B    4/2013

OTHER PUBLICATIONS

Written Opinion of the International Searching Authority and International Search Report for PCT/CA2023/051763, dated Mar. 15, 2024.

*Primary Examiner* — Craig M Schneider
*Assistant Examiner* — Andrew J Rost
(74) *Attorney, Agent, or Firm* — Adenike Adebiyi; Thomas Mahon

(57) ABSTRACT

A hydraulic valve includes two ports, a chamber within the valve housing which, in operation, is at least partially filled with a hydraulic fluid, and a fluid switch within the chamber. The fluid switch is movable between at least a first position and a second position. In the first position, the ports are fluidly coupled to each other. In the second position, the ports are fluidly isolated from each other. An external surface of the fluid switch is separated from an internal surface of the chamber by a first micro-gap. Another external surface of the fluid switch is separated from another internal surface of the chamber by a second micro-gap. The first micro-gap and the second micro-gap are fluidly coupled to the chamber, and each have a respective size of less than about five micrometers.

19 Claims, 27 Drawing Sheets

(51) Int. Cl.
   *F15B 1/26* (2006.01)
   *F15B 13/04* (2006.01)
   *F15B 13/08* (2006.01)
   *F16K 27/04* (2006.01)

(52) U.S. Cl.
   CPC .......... *F15B 13/0821* (2013.01); *F16K 11/24* (2013.01); *F16K 27/048* (2013.01); *F16K 27/041* (2013.01)

(58) Field of Classification Search
   CPC .......... F15B 1/26; F16K 11/24; F16K 27/048; F16K 27/041; F16K 31/008; F16K 31/007; F16K 11/0716; F16K 11/0712; F16K 11/0708; F16K 11/07; F16K 99/0011
   See application file for complete search history.

(56) References Cited

U.S. PATENT DOCUMENTS

| | | | |
|---|---|---|---|
| 6,540,203 B1 * | 4/2003 | Hunnicutt | B60T 8/3695 251/129.01 |
| 8,113,482 B2 | 2/2012 | Hunnicutt | |
| 8,393,344 B2 * | 3/2013 | Hunnicutt | F16K 99/0001 137/625.34 |
| 9,488,293 B2 * | 11/2016 | Fuller | F16K 99/0011 |
| 9,512,936 B2 * | 12/2016 | Fuller | F16K 99/0011 |
| 9,625,053 B2 * | 4/2017 | Hoemke | F16K 31/122 |
| 9,897,233 B2 | 2/2018 | Zhang | |
| 10,094,490 B2 * | 10/2018 | Arunasalam | F16K 99/0005 |
| 10,746,201 B2 | 8/2020 | Weickel et al. | |
| 2007/0075286 A1 * | 4/2007 | Tanner | F16K 11/07 251/129.06 |
| 2017/0184213 A1 * | 6/2017 | Motoki | F16H 61/0251 |
| 2020/0166151 A1 * | 5/2020 | Jaskiewicz | F16K 31/008 |

* cited by examiner

LOW-POWER HYDRAULIC VALVE, AND APPLICATIONS THEREOF IN ROBOT SYSTEMS

CROSS-REFERENCE TO RELATED APPLICATIONS

This application claims the benefit of U.S. Provisional Application No. 63/435,175, filed Dec. 23, 2022, the contents of which are incorporated herein by reference.

FIELD

The present systems, devices, and methods generally relate to hydraulic valves, and particularly relate to hydraulic valves for hydraulically-actuated robotic components.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

Hydraulic systems can include one or more hydraulic valves. A hydraulic valve can control a flow of hydraulic fluid in a hydraulic system. Some hydraulic valves control the flow of hydraulic fluid by opening or closing the valve. Some hydraulic valves control the flow of hydraulic fluid by continuously regulating the flow. Hydraulic valves can be actuated, for example, by a handle, knob or cam, or can be solenoid-operated or pilot-operated.

A directional control valve can pause and restart a flow of hydraulic fluid, and/or change a direction of flow. An example of a directional control valve is a two-way directional control valve comprising two ports referred to as an inlet and an outlet.

A pressure control valve can regulate a pressure of a hydraulic fluid in a hydraulic system, for example by releasing an excess pressure.

A flow control valve can be used to improve hydraulic system performance by adjusting a flow of a hydraulic fluid through the hydraulic system.

SUMMARY

In a first representative example, a hydraulic valve includes a valve housing having a first inner surface and a second inner surface in opposing relation, a chamber disposed between the first inner surface and the second inner surface, a first port connected to the chamber, and a second port connected to the chamber. The hydraulic valve includes a fluid switch disposed within the chamber. The fluid switch includes a first external surface adjacent to the first inner surface and a second external adjacent to the second inner surface. The fluid switch is movable between a first position in which the fluid switch fluidly connects the first port to the second port via a first flow path extending through the fluid switch and a second position in which the fluid switch fluidly disconnects the first port from the second port. The hydraulic valve includes a fluid bearing arranged in the chamber to support movement of the fluid switch. The fluid bearing includes a first micro-gap separating the first inner surface from the first external surface, a second micro-gap separating the second inner surface from the second external surface, and a hydraulic fluid disposed in the first micro-gap and the second micro-gap.

In a second representative example, a hydraulic system includes a hydraulic actuator, a hydraulic pump, a reservoir, and a hydraulic valve. The hydraulic valve includes a valve housing having a first inner surface and a second inner surface in opposing relation, a chamber disposed between the first inner surface and the second inner surface, a first port connected to the chamber, and a second port connected to the chamber. The first port is fluidly connected to the hydraulic pump, and the second port is fluidly connected to the reservoir. The hydraulic valve includes a fluid switch disposed within the chamber. The fluid switch includes a first external surface adjacent to the first inner surface and a second external adjacent to the second inner surface. The fluid switch is movable between a first position in which the fluid switch fluidly connects the first port and the second port via a first flow path extending through the fluid switch and a second position in which the fluid switch fluidly disconnects the first port from the second port.

In a third representative example, a robot comprises a robot body, a robotic hand coupled to the robot body, the robotic hand having a first digit, a hydraulic actuator coupled to the robotic hand and operably coupled to the first digit, and a hydraulic system including a hydraulic pump, a reservoir, and a hydraulic valve. The hydraulic valve includes a valve housing having a first inner surface and a second inner surface in opposing relation, a chamber disposed between the first inner surface and the second inner surface, a first port connected to the chamber, and a second port connected to the chamber. The first port is fluidly connected to the hydraulic pump, and the second port is fluidly connected to the reservoir. The hydraulic valve includes a fluid switch disposed within the chamber. The fluid switch includes a first external surface adjacent to the first inner surface and a second external adjacent to the second inner surface. The fluid switch is movable between a first position in which the fluid switch fluidly connects the first port and the second port via a first flow path extending through the fluid switch and a second position in which the fluid switch fluidly disconnects the first port from the second port.

DETAILED DESCRIPTION

Figure 1A:
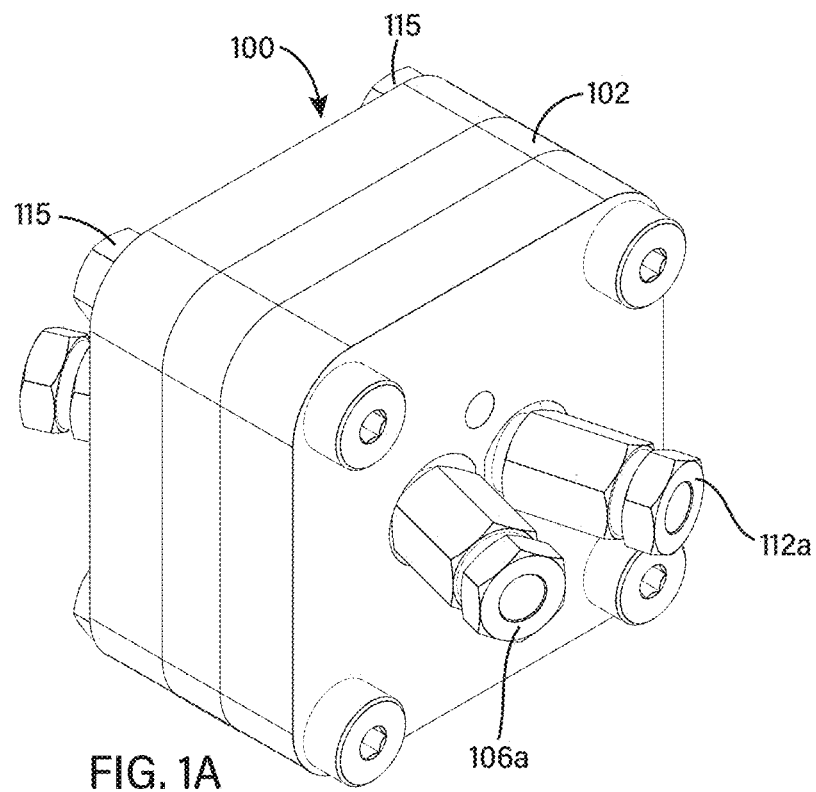
FIG. 1A is a perspective view of an example hydraulic valve with a linear-displacement fluid switch.
Figure 1B:
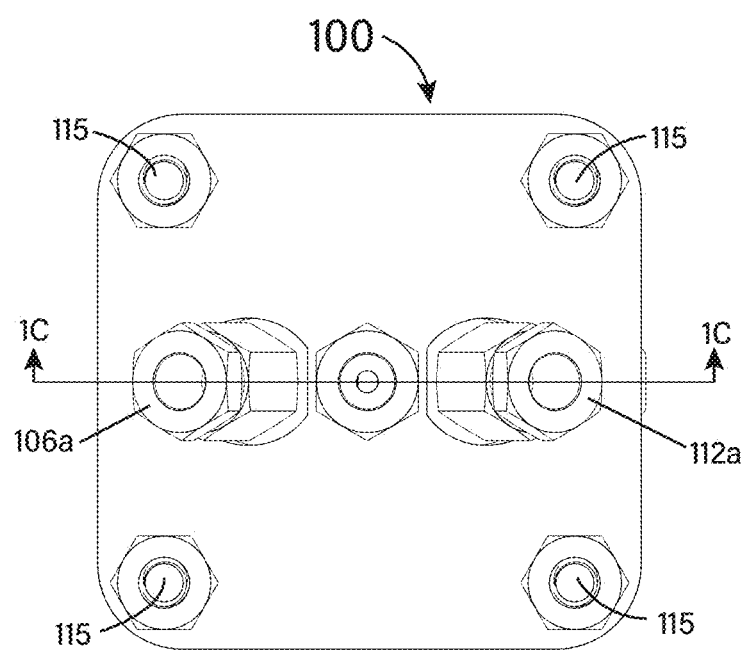
FIG. 1B is an end view of the hydraulic valve shown in FIG. 1A.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various implementations described herein include systems, devices, and methods for hydraulic valves suitable for use in a hydraulic system, for example a hydraulic system used in a hydraulically-powered robot.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described in the present application includes hydraulic valves for hydraulic applications including but not limited to hydraulic systems providing power in a robotic system. For example, valves can be used in a hydraulic system providing power to an end effector of a robotic system (e.g., to a hand of a humanoid robot), wherein some or all of the hydraulic system is adapted and/or miniaturized to fit at least partially inside the robot (e.g., inside a robotic arm).

In some implementations, at least a portion of the hydraulic system (e.g., at least one hydraulic hose) is routed through a pivot joint (e.g., a shoulder, an elbow, a forearm, a wrist and/or a knuckle of the robotic arm). A pivot joint can be an example of a restricted space. A restricted space may be restricted in volume, for example. A restricted space may include moving components that can interfere with hydraulic hoses in the space and/or traversing the space, as well as other hydraulic fittings and components in the space. A restricted space may have a volume and/or a shape that can change during operation, e.g. the robot is in motion or is executing a task. In restricted spaces in general, and pivot joints as an example, it can be advantageous for hydraulic fittings to be more compact. It may also be advantageous for hydraulic hoses and fittings (e.g., hydraulic valves) to have smaller dimensions in restricted spaces.

An object or shape is defined as humanoid when it has an appearance, or a character, resembling that of a human. For example, a humanoid robot is a robot having an appearance or a character resembling that of a human. A humanoid robot may be "humanoid" in its entirety or may have humanoid components (e.g., a torso, a head, arms, and hands) coupled to non-humanoid components (e.g., a wheeled base). While the following description focuses mainly on a hydraulically-powered humanoid robot, a person of skill in the art will appreciate that a hydraulic system in accordance with the present technology may be used to control a hand, a foot, a tail, a head, or any applicable end effector or actuator in a humanoid or non-humanoid robot.

Using hydraulics to drive a robotic arm and/or an end effector can be advantageous for reasons that include the following: Hydraulics can provide high speed and strength within a humanoid envelope of shape and size. To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid. Hydraulics can provide a high power density especially if the motor is outside the constrained volume. Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded. Hydraulics can provide centralized power and thereby apply full power onto a single degree of freedom (DOF). Hydraulics can provide high-fidelity control of the robot, i.e., high precision in the movement of the robot.

Hydraulic systems include hydraulic hoses to provide hydraulic coupling, and hydraulic fittings to secure hydraulic hoses to other hydraulic components, e.g., pumps, valves, and actuation pistons.

A conventional spool valve is an example of a hydraulic valve, and includes a cylinder (a spool) in a sealed chamber in a valve body, and at least one through-hole drilled through the body from one side to the other to form ports. The spool can be moved within the body to open or close the ports to the flow of hydraulic fluid. The spool can be actuated, for example, by a button, a lever, or a solenoid. In some solenoid-operated spool valves, a spring can be used to return the spool to its resting position. In other solenoid-operated spool valves, there is a solenoid at each end of the valve. Conventional spool valves can be sliding or rotary.

It can be desirable to reduce the power requirements of a miniaturized hydraulic valve. Some miniaturized hydraulic valves can use about 10 W of power. In an example implementation having forty valves in a robotic arm, the power requirement of 400 W can be difficult to support. The power requirements can be reduced, for example, a) by lowering an actuation force (i.e., reducing a resistance), and/or b) by lowering a stroke of the hydraulic valve (i.e., reducing movement).

The present technology eliminates or at least reduces the use of gaskets, seals, and/or O-rings in a hydraulic valve. In valve locations where a gasket, seal, and/or O-ring would typically be employed, the implementations described herein replace such gaskets, seals, and/or O-rings by sufficiently narrow gaps, each referred to in the present application as a micro-gap. A micro-gap can be less than about five micrometers, for example.

Elastomer seals can introduce friction and add to the actuation force needed to operate a hydraulic valve. Eliminating an elastomer seal can result in less friction and a lower actuation force. While the presence of a micro-gap may result in some leakage of hydraulic fluid between surfaces on either side of the micro-gap, the micro-gap can be small enough in size so that the leakage is negligible (for example, less than about 0.001 LPM). As mentioned above, the micro-gap can be less than about 5 μm, and, in some implementations, can be between 1 μm and 3 μm. If the micro-gap is sufficiently small, the hydraulic fluid in the micro-gap can act like a hydrostatic bearing to further reduce friction and further lower the actuation force.

Figure 1C:
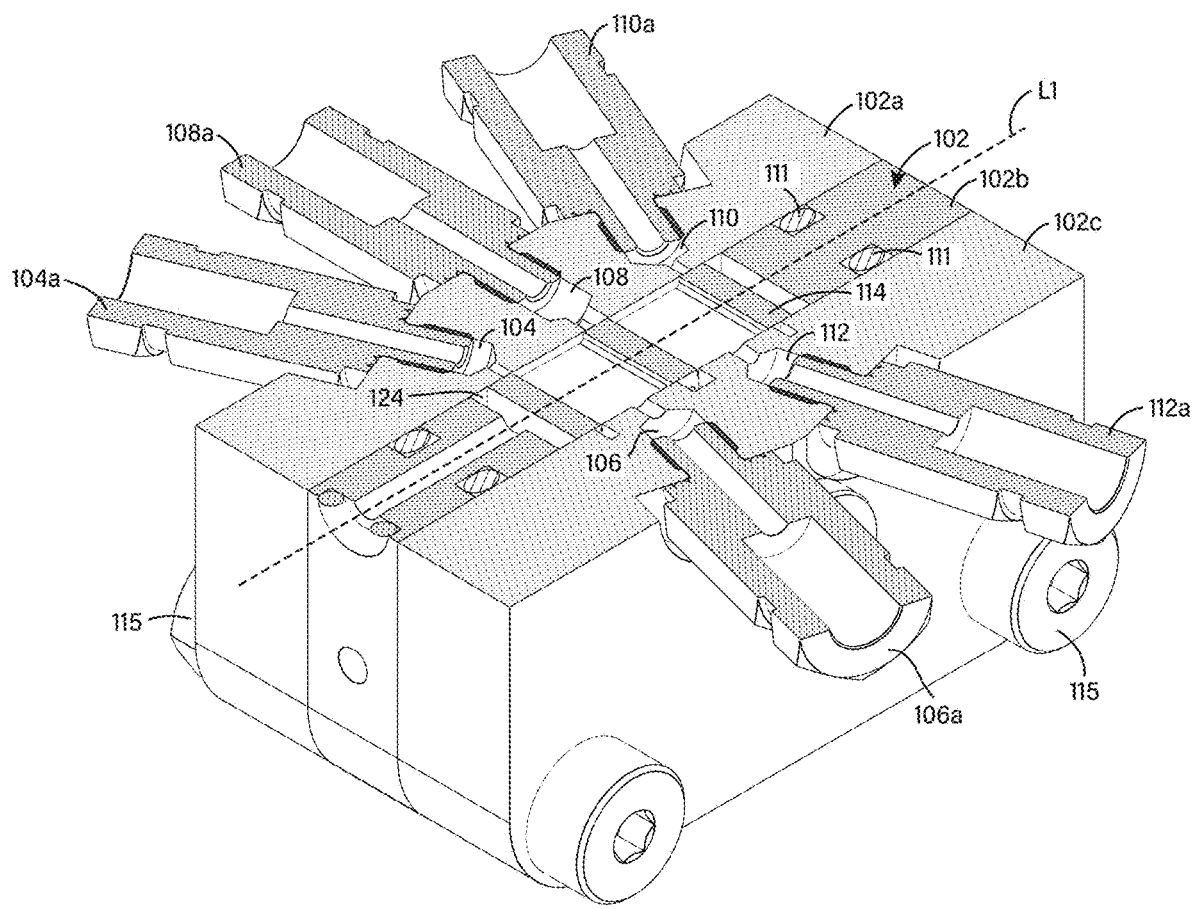
FIG. 1C is a perspective cross-sectional view of the hydraulic valve shown in FIG. 1A, with the cutaway plane along line 1C-1C in FIG. 1B.
Figure 1D:
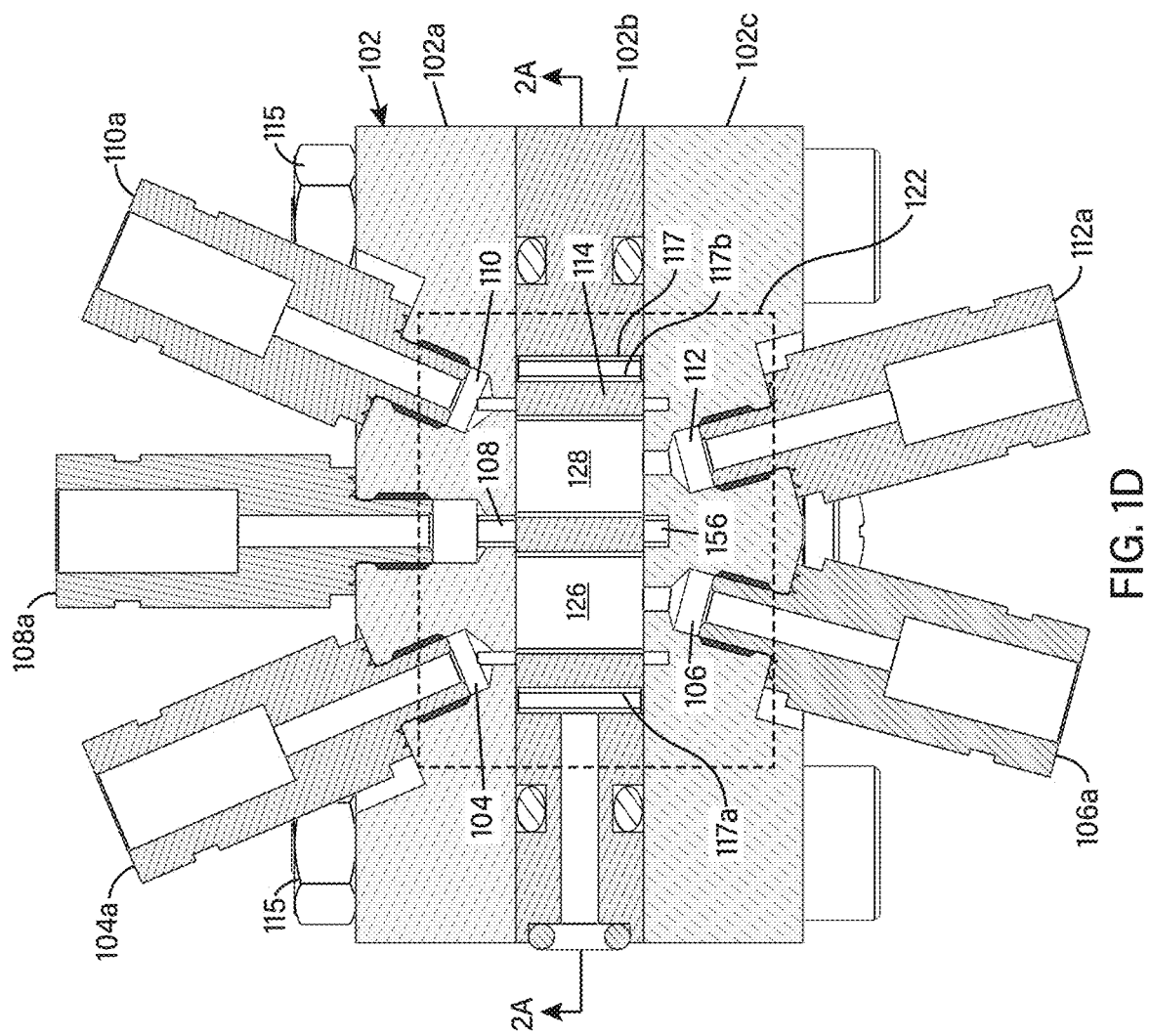
FIG. 1D is a top view of the hydraulic valve cross-section shown in FIG. 1C.

FIGS. 1A-1H illustrate various aspects of an exemplary hydraulic valve 100. In some examples, the hydraulic valve 100 includes a valve housing 102 having a chamber 124 and two or more ports (e.g., ports 104, 106, 108, 110, and 112). The hydraulic valve 100 includes a fluid switch 114 disposed within the chamber 124 and movable within the chamber 124 (e.g., along a linear axis L1 as shown in FIG. 1C). The fluid switch 114 can be, for example, a valve piston. The fluid switch 114 can move to positions in which the fluid switch 114 can permit and/or restrict fluid flow through the valve. The hydraulic valve 100 includes a fluid bearing (e.g., a hydrostatic bearing) that supports the fluid switch 114 (e.g., allows the fluid switch to float) within the chamber 124. In some examples, the fluid bearing includes layers of hydraulic fluid (e.g., an oil such as peanut oil or mineral oil) in micro-gaps 146, 152 (see FIG. 1E) formed between opposing surfaces of the fluid switch 114 and the valve housing 102. In some examples, the hydraulic valve 100 can include an external actuator (e.g., actuator 120 in FIG. 1F) arranged to move the fluid switch 114 to desired positions inside the chamber 124. In the examples, the hydraulic valve 100 can include one or more actuators (e.g., actuators 121, 123 in FIGS. 1G and 1H) arranged within the valve housing 102 to move the fluid switch 114 to desired positions inside the chamber 124.

Each of the ports 104, 106, 108, 110, 112 formed in the valve housing 102 can include a respective hydraulic fitting 104a, 106a, 108a, 110a, 112a (e.g., hydraulic hose fitting) for coupling the port to a hydraulic line (e.g., a hydraulic hose). Any of the ports 104, 106, 108, 110, 112 can function as an inlet port or outlet port of the valve, depending on the configuration and use of the valve. In some examples, one or more of the ports 104, 106, 108, 110, 112 can be hydraulically coupled to a high pressure line (e.g., a hydraulic line coupled to a hydraulic pump or accumulator). In some examples, the pressure in the high pressure line can be at least 700 pounds per square inch (psi) (4.826 kPa) (e.g., 800 psi (5.516 kPa)). In some examples, one or more of the ports 104, 106, 108, 110, 112 can be hydraulically coupled to a low pressure line (e.g., a hydraulic line coupled to a hydraulic reservoir). In some examples, one or more of the ports 104, 106, 108, 110, 112 can be coupled to a hydraulic actuator.

In some examples, the valve housing 102 is generally planar (e.g., opposing external surfaces of the valve housing 102 are generally parallel to each other). In the illustrated example, the valve housing 102 includes a stack of plate members 102a, 102b, 102c secured together (e.g., by bolt connections 115). In the illustrated example, the ports 104, 106, 108 are formed in the plate member 102a, and the ports 110, 112 are formed in the plate member 102c. However, other arrangements of the ports in the valve housing 102 are possible. The middle plate member 102b includes a central opening forming the chamber 124 in which the fluid switch 114 is disposed. Seal members 111 can be disposed at the interfaces between the plate members 102b, 102a and 102b, 102c to prevent fluid in the chamber 124 from leaking out of the valve. In other examples, the valve housing 102 can be formed from fewer plate members (e.g., two plate members) or can be a unitary housing. For example, the middle plate member 102b can be integrally formed with either of the end plate members 102a, 102c. The valve housing 102 can be manufactured from a lightweight material such as aluminum or brass. The valve housing 102 can be manufactured by one or more of casting, molding, 3D printing, or machining.

Figure 2A:
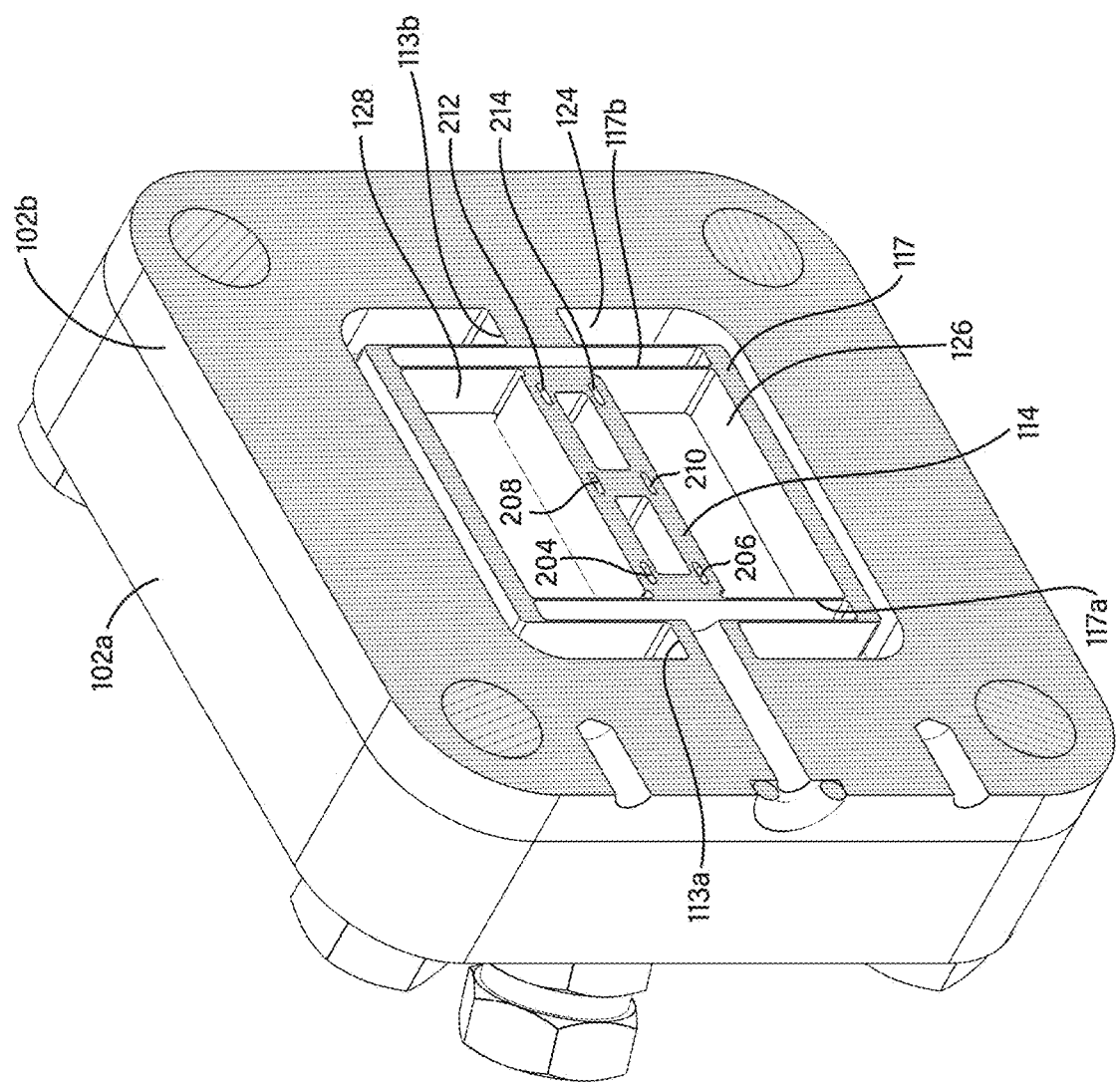
FIG. 2A is a perspective cross-sectional view of the hydraulic valve of FIG. 1A showing fluid coupling passages in the fluid switch.

In some examples, as shown more clearly in FIG. 2A, the middle plate member 102b includes posts 113a, 113b extending into the central opening that forms the chamber 124 and in opposing relation to each other. A fluid switch holder 117 is arranged between and attached to the posts 113a, 113b. The fluid switch holder 117 includes a central opening to accommodate the fluid switch 114. In some examples, the fluid switch 114 is disposed between and attached to opposing arms 117a, 117b of the fluid switch holder 117. In some examples, the arms 117a, 117b are flexures (e.g., thin flexible materials) that can deform in response to applied force and return to a neutral position when the force is removed. In some examples, deformation of the arms 117a, 117b (e.g., bowing of the arms 117a, 117b) can cause linear displacement of the fluid switch 114 within the chamber 124 or return of the stroke of the fluid switch 114.

Figure 1E:
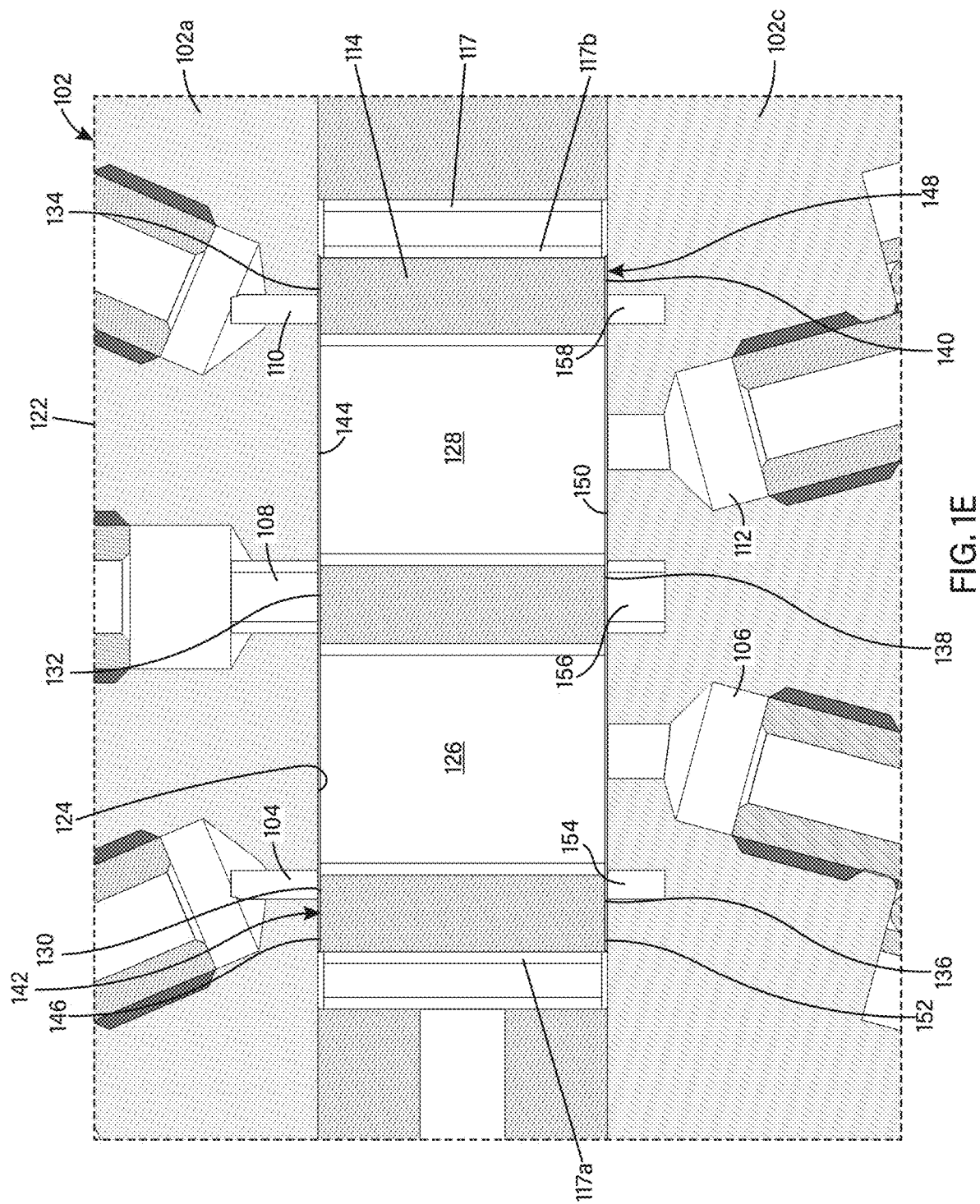
FIG. 1E is a close-up view of the region shown by dashed rectangle in FIG. 1D.

Referring to FIG. 1E, the valve housing 102 includes a first inner surface 144 at a first end of the chamber 124 (e.g., upper end of the chamber in the drawing). The first inner surface 144 can be provided by the plate member 102a, for example. The valve housing 102 includes a second inner surface 150 at a second end of the chamber 124 e.g., the lower end of the chamber in the drawing). The second inner surface 150 can be provided by the plate member 102c, for example. The inner surfaces 144, 150 of the valve housing 102 are in opposing relation. The fluid switch 114 includes a first external surface 142 disposed adjacent to, and in opposing relation to, the first inner surface 144 of the valve housing 102. The fluid switch 114 includes a second external surface 148 disposed adjacent to, and in opposing relation to, the second inner surface 150 of the valve housing 102. The fluid switch 114 includes inner channels 126, 128 with openings at the first external surface 142 and the second external surface 148.

The first external surface 142 of the fluid switch 114 includes landings (or surface portions) 130, 132, 134 that can be positioned relative to the ports 104, 108, 110, for example, to open or close the ports. The second external surface 148 of the fluid switch 114 include landings (or surface portions) 136, 138, 140 that can be positioned relative to the ports 106, 112, for example, to open or close the ports. The first external surface 142 of the fluid switch 114 is separated (or the landings 130, 132, 134 are separated) from the opposing first inner surface 144 of the valve housing 102 by a micro-gap 146. In some examples, there is no seal or gasket or other solid element separating the surfaces 142,144. The second external surface 148 of the fluid switch 114 is separated (or the landings 136, 138, 140 are separated) from the opposing second inner surface 150 of the valve housing 102 by a micro-gap 152. In some examples, there is no seal or gasket or other solid element separating the surfaces 148, 150.

Herein, the term micro-gap refers to a gap having a size less than about 5 micrometers (μm), where the terms "about" and "approximately" are used throughout this specification to mean "within 10%". In one example, the micro-gaps can have a size of approximately 0.5 μm or less. The micro-gaps 146, 152 may be fluidly coupled to the chamber 124. The micro-gap 146, 152 may be filled with hydraulic fluid (e.g., from the chamber 124 or from the channels 126, 128 in the fluid switch 114 or from the ports 104, 106, 108, 110, 112 in the valve housing 102). Fluid layers in the micro-gaps 146, 152, disposed on opposite sides of the fluid switch 114, can provide a fluid bearing for the fluid switch 114. Such fluid bearing can avoid friction between the external surfaces of the fluid switch 114 and internal surfaces of the valve housing 102 as the fluid switch 114 moves between different positions to close or open the valve.

In some operational scenarios, the fluid pressure at one or more of the ports 104, 108, 110 may have a relatively high pressure, while the fluid pressure at one or more of the ports 106, 112 may have a relatively low pressure. For example, during operation of the valve, the port 104 may be connected to a high pressure line, and the port 106 may be connected to a low pressure line. The different fluid pressures acting on the fluid switch 114 at the ports can result in imbalance in the forces exerted on the fluid switch 114, which can skew the fluid switch 114 to one side of the chamber 124, resulting in micro-gaps 146, 152 with different sizes. In some examples, it may be desirable for the sizes of the micro-gaps 146, 152 to be approximately the same and approximately constant during operation of the valve so as to provide a uniform fluid bearing for the fluid switch 114.

One mechanism for balancing the forces on the fluid switch 114 and therefore balancing the sizes of the micro-gaps 146, 152 can include fluidly coupling the micro-gaps 146, 152. In one example, cavities 154, 156, and 158 are formed in the valve housing 102 (e.g., in the plate member 102c). The cavities 154, 156, 158 are arranged generally opposite and fluidly coupled to the ports 104, 108, 110, respectively. For example, each of the ports 104, 108, and 110 can have a respective passage that either passes through the fluid switch 114 or wraps around the fluid switch 114 to provide the fluid coupling to the cavities 154, 156, and 158, respectively. Since the pressure at the ports 104, 108, 110 can be communicated to the cavities 154, 156, 158, hydraulic fluid can flow at least approximately uniformly on both sides of the fluid switch 114 (e.g., in the micro-gaps 146, 152) to keep forces at the opposite sides of the fluid switch 114 approximately balanced, which would keep the micro-gaps 146 and 152 at approximately the same size and at approximately a constant size.

Figure 2B:
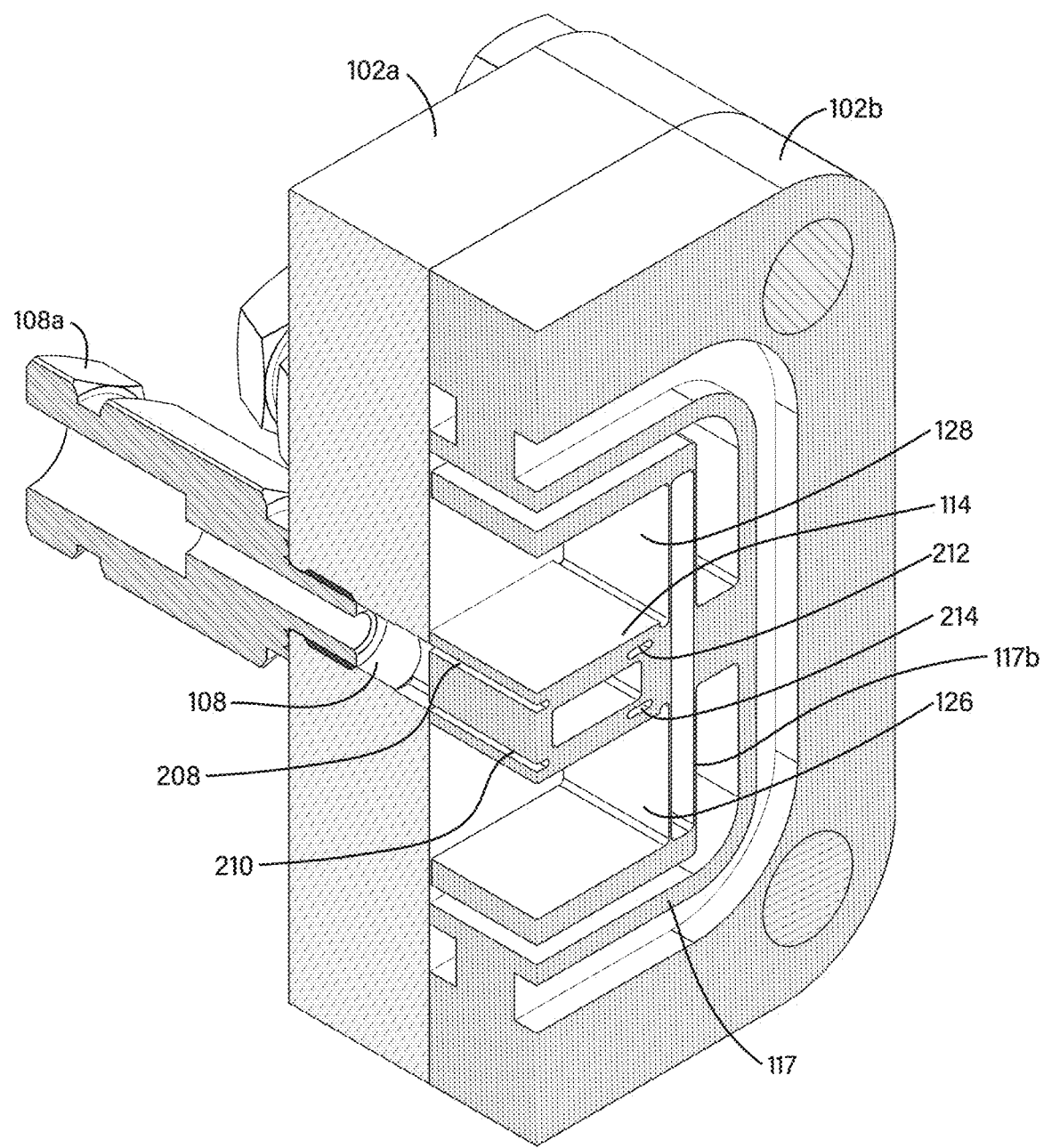
FIG. 2B is a cutaway view of the perspective cross-sectional view of the hydraulic valve shown in FIG. 2A.

In one example, as illustrated in FIGS. 2A and 2B passages 204, 206, 208, 210, 212, and 214 can be formed in the fluid switch 114. The passages 204, 206, 208, 210, 212, and 214 can extend between the external surfaces 142, 148 of the fluid switch 114. One end of the passages 204, 206 can communicate with the cavity 154 through the micro-gap 152, while the other end of the passages 204, 206 can communicate with the opening of the port 104 through the micro-gap 146. Similarly, one end of the passages 208, 210 can communicate with the cavity 156 through the micro-gap 152, while the other end of the passages 208, 210 can communicate with the port 108 through the micro-gap 146. Similarly, one end of the passages 212, 214 can communicate with the cavity 158 through the micro-gap 152, while the other end of the passages 212, 214 can communicate with the port 110 through the micro-gap 146.

Figure 1F:
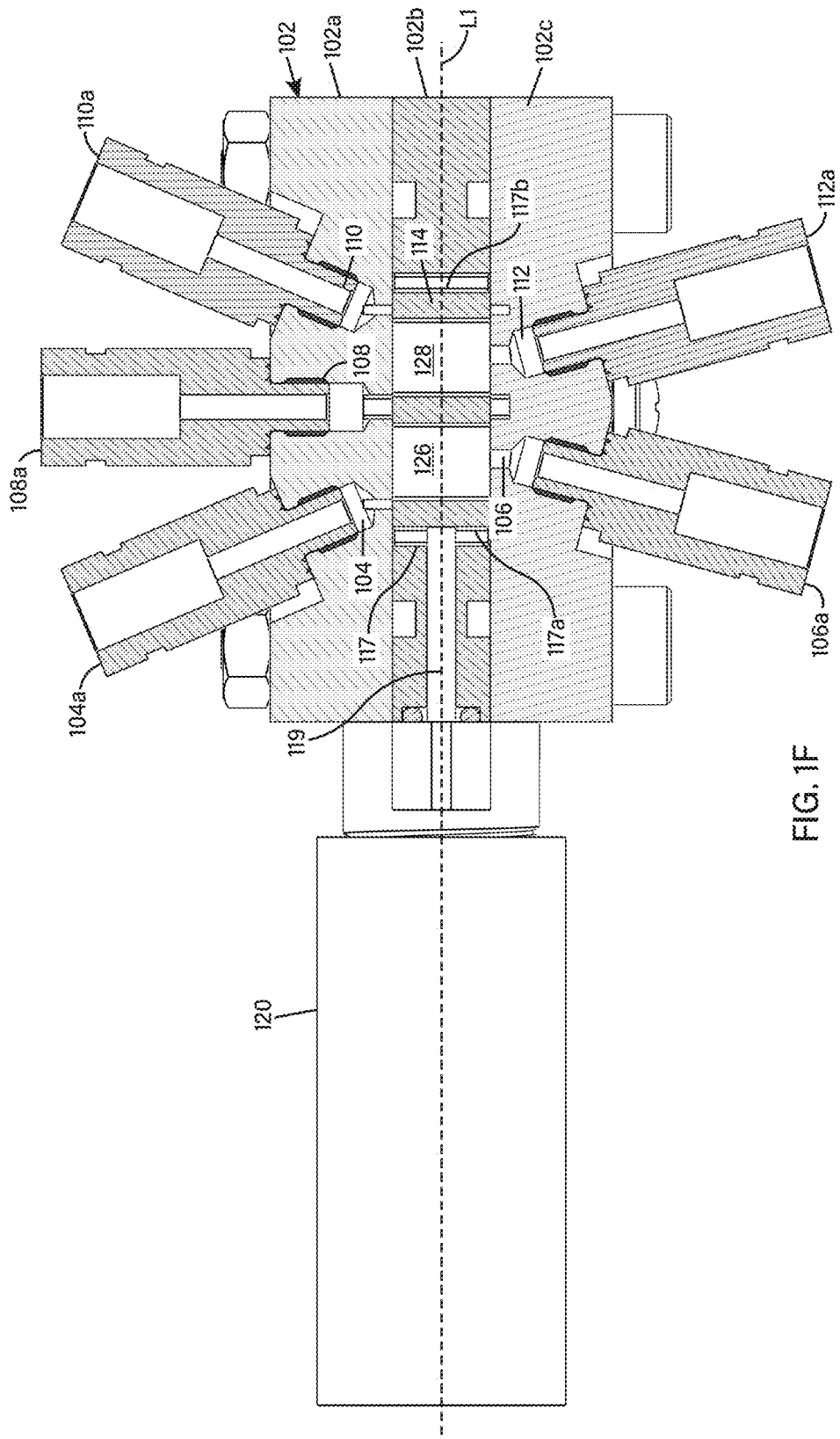
FIG. 1F illustrates an actuator coupled to the hydraulic valve shown in FIG. 1C.

The fluid switch 114 can move within the chamber 124 by action of one or more actuators. In one example, as illustrated in FIG. 1F, an actuator 120 (e.g., a linear actuator) can coupled to the exterior of the valve housing 102. The actuator 120 can include an output shaft 119 that extends into the chamber 124 (e.g., through an opening in the plate member 102b) and is axially aligned with the fluid switch 114 (e.g., along the axis L1). In some examples, the output shaft 119 can extend through an opening in the fluid switch holder 117 and engage the arm 117a of the fluid switch holder 117 in a neutral position. The actuator 120 can be operated to displace the output shaft 119 along the axis L1 and thereby displace the fluid switch 114 along the axis L1. In some examples, the output shaft 119 may not be attached to the arm 117a such that when the output shaft 119 is retracted along the axis L1, the output shaft 119 does not pull the arm 117a back to a neutral position. In these examples, the arms 117a, 117b may be flexure arms that can spring back to return the stroke of the fluid switch 114 when the output shaft 119 retracts along the axis L1.

Figure 1G:
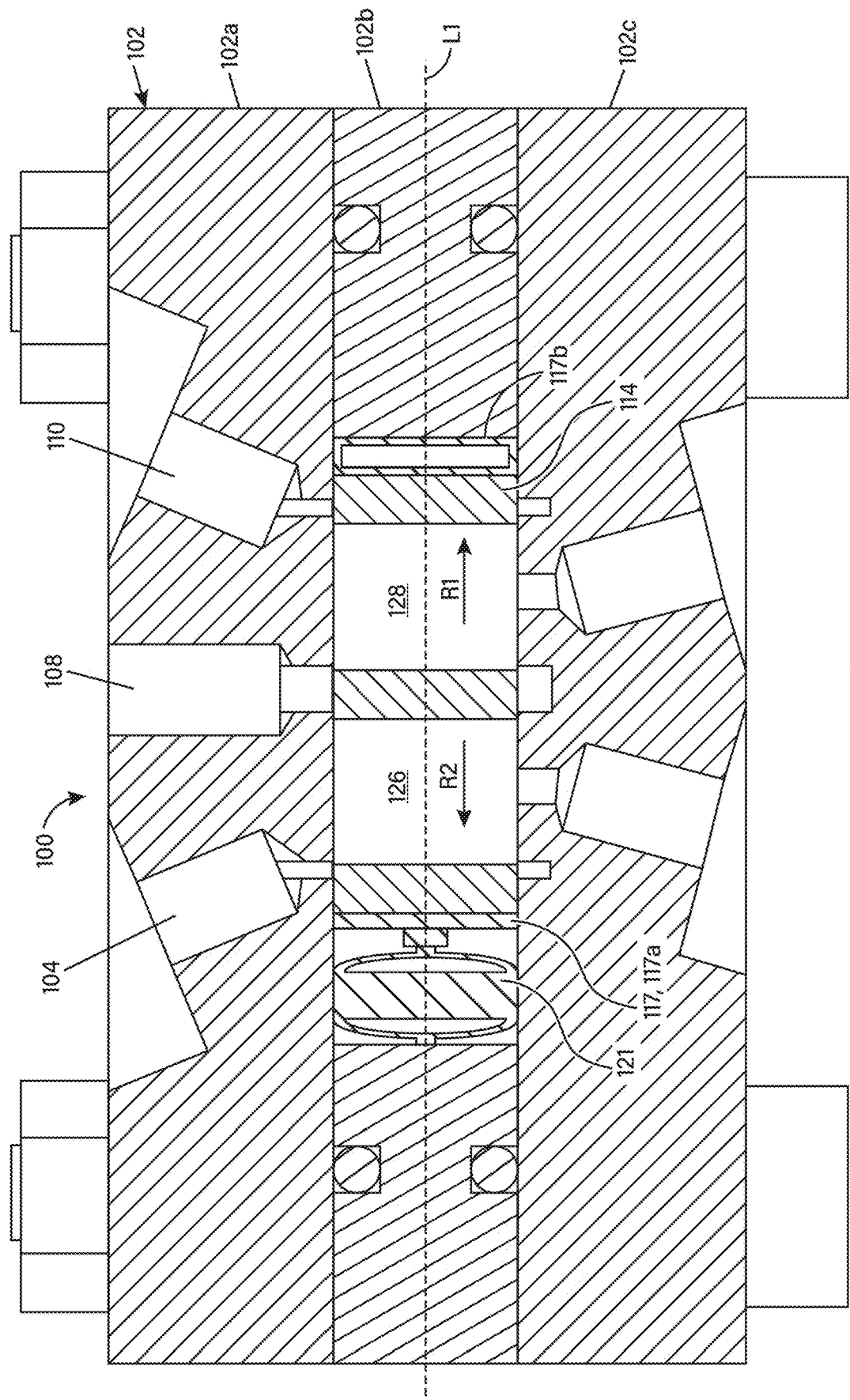
FIG. 1G illustrates the hydraulic valve of FIG. 1A with one internal actuator.

In some examples, one or more actuators can be disposed within the chamber 124 of the valve housing 102 and used to move the fluid switch 114 linearly within the chamber 124. FIG. 1G illustrates an example where a piezo actuator 121 (e.g., an amplified piezo actuator) is disposed within the chamber 124. One end of the piezo actuator 121 is attached to the valve housing 102 (e.g., to the plate member 102b), and the other end of the piezo actuator 121 is coupled to the fluid switch 114 (e.g., the other end of the piezo actuator 121 can be directly attached to the fluid switch 114 or to arm 117a that is attached to the fluid switch 114). In some examples, the opposite end of the fluid switch 114 can be coupled to the valve housing 102 (e.g., attached to the arm 117b that is attached to the valve housing 102). In some examples, at least the arm 117b can be a flexure that can function as a return spring to return the stroke of the fluid switch 114.

The piezo actuator 121 can include a piezoelectric material that expands and/or contracts in response to electrical signals. In some examples, an increase in voltage (or a positive voltage) applied to the piezo actuator 121 can cause the fluid switch 114 to move in a first direction R1 along the axis L1, and a decrease in voltage (or a negative voltage) can cause the fluid switch to move in a second direction R2 that is opposite to the first direction. In some examples, the neutral position of the fluid switch 114 can correspond to zero voltage of the piezo actuator 121. The neutral position can be, for example, when all the port are covered by the respective landings. In some examples, to take advantage of a larger range of positive voltages, the zero-voltage position of the fluid switch 114 can be offset to the right (e.g., the central position of fluid switch 114 corresponds to a positive offset voltage).

Figure 1H:
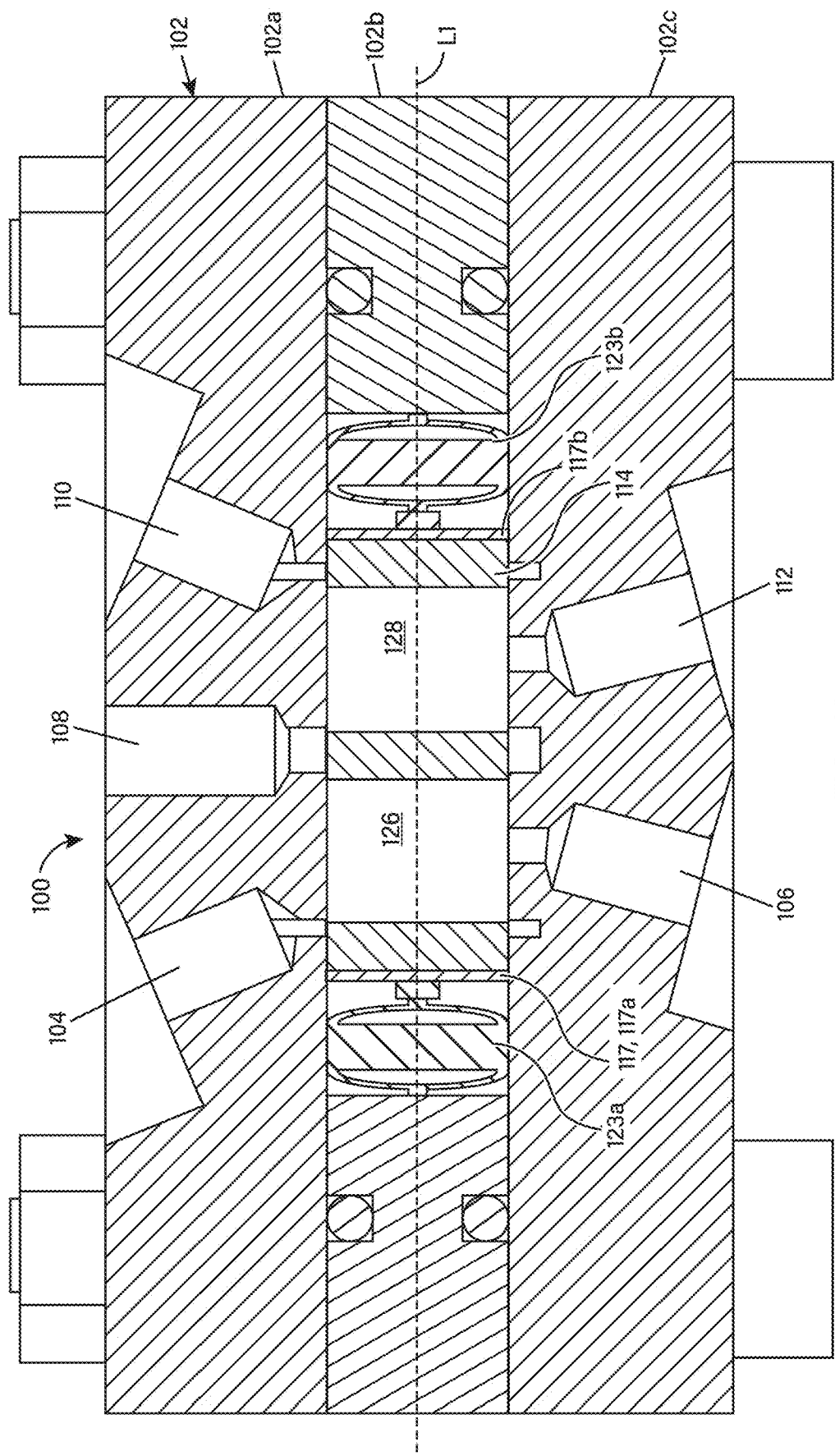
FIG. 1H illustrates the hydraulic valve of FIG. 1A with two internal actuators.

FIG. 1H illustrates another example where piezo actuators 123a, 123b (e.g., amplified piezo actuators) are disposed within the chamber 124 at opposite ends of the fluid switch 114. One end of the piezo actuator 123a can be attached to the valve housing 102 (e.g., to the plate member 102b), and the other end of the piezo actuator 123a can be coupled to one end of the fluid switch 114 (e.g., engage one end of the fluid switch 114 or the arm 117a attached to the fluid switch 114). One end of the piezo actuator 123b can be attached to the valve housing 102 (e.g., to the plate member 102b), and the other end of the piezo actuator 123b can be coupled to the other end of the fluid switch 114 (e.g., engage the other end of the fluid switch 114 of the arm 117b attached to the other end of the fluid switch 114). The piezo actuators 123a, 123b can be operated to move the fluid switch 114 along the axis L1. In this example, the operations of the piezo actuators 123a, 123b can be synchronized such that when one piezo actuator expands, the other piezo actuator contracts, resulting in displacement of the fluid switch 114 in the same direction by action of the two piezo actuators. In this case, the arms 117a, 117b do not need to function as return springs.

Figure 3A:
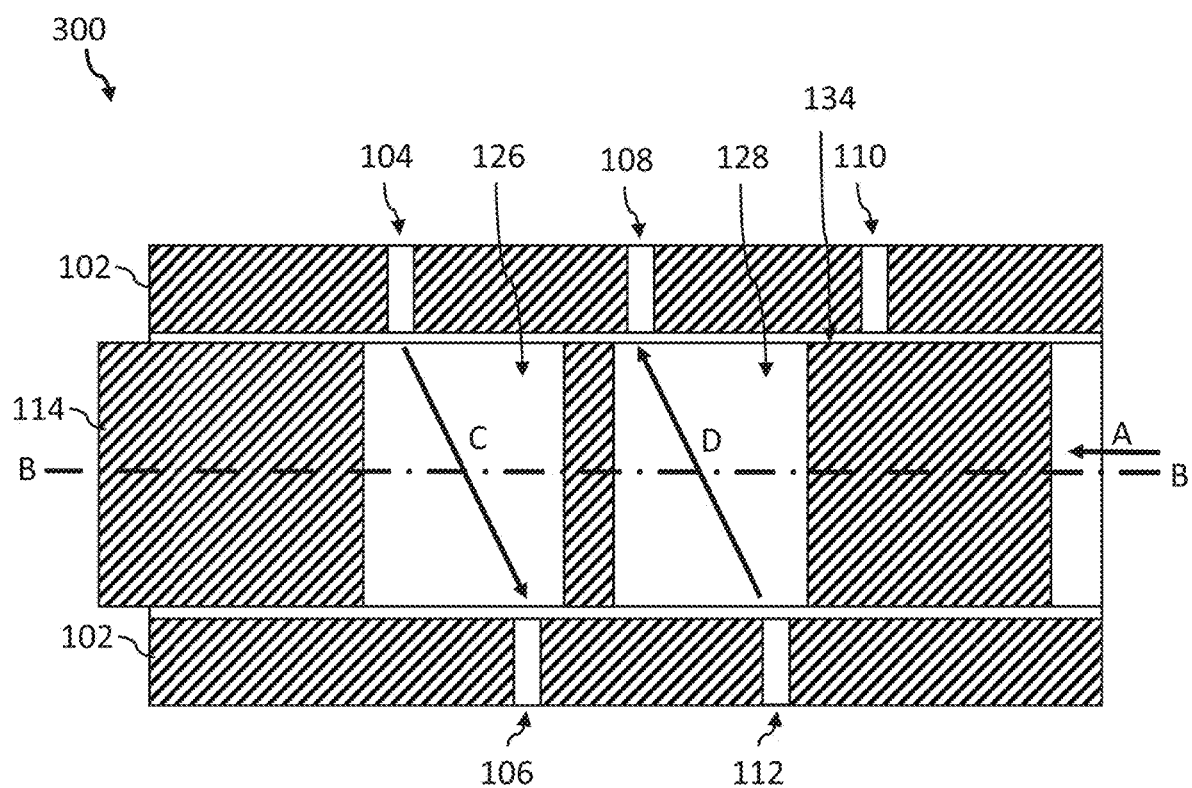
FIGS. 3A and 3B are cutaway schematic views of a portion of the hydraulic valve of FIG. 1A showing different positions of the fluid switch, in accordance with the present systems, devices, and methods.
Figure 3B:
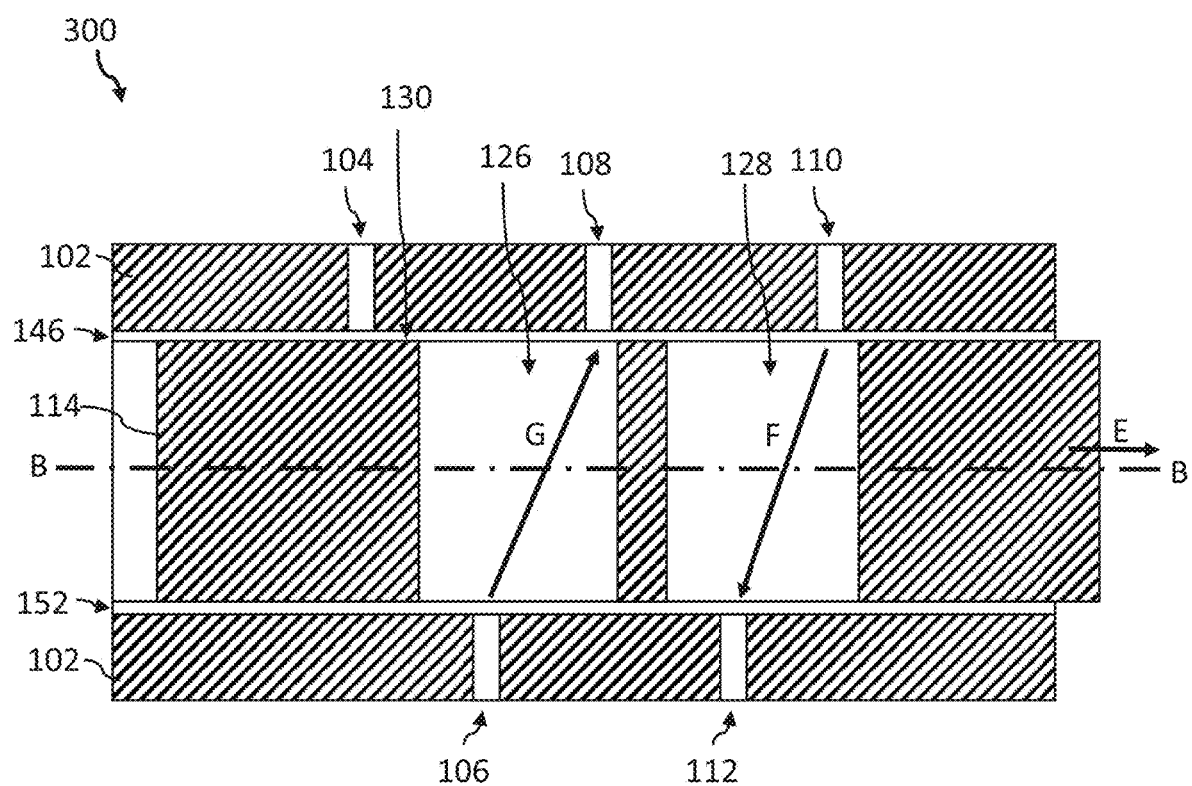

FIGS. 3A and 3B illustrate a portion 300 of the hydraulic valve 100 with different positions of the fluid switch 114. In an example operation of the hydraulic valve 100, the ports 104, 110 can be hydraulically coupled to high-pressure lines (e.g., from a hydraulic pump), and the port 108 can be hydraulically coupled to a low-pressure line (e.g., to a hydraulic reservoir). The ports 104, 110 can be inlet ports. The ports 106, 112 can be outlet ports that can be hydraulically coupled to a hydraulic actuator that is to be operated with the hydraulic valve 100.

The fluid switch 114 can move from one position to another position by a linear motion (indicated by arrows A and E) along an axis of translation (indicated by axis B-B) (e.g., by operation of an actuator). As illustrated in FIG. 3A, the fluid switch 114 can move in a first direction to a first position where the landing 130 does not cover the opening of the inlet port 104 (or is laterally displaced from the opening of the inlet port 104), the landing 132 does not cover the opening of the port 108 (or is laterally displaced from the opening of the port 108), and the landing 134 covers the opening of the outlet port 110 (or is aligned with the opening of the outlet port 110). In the first position, the inlet port 104 can be fluidly coupled to the outlet port 106 through the channel 126 (as indicated by arrow C). In the first position, the port 108 can be fluidly coupled to the inlet port 112 through the channel 128 (as indicated by arrow D). In the example illustrated in FIGS. 3A and 3B, the inlet port 112 is fluidly isolated from the inlet port 110 by the landing 134 that covers the inlet port 110.

The hydraulic valve 100 can be operated as a double-acting hydraulic valve in the first position of the fluid switch 114. For example, the inlet port 104 may be hydraulically coupled to a high-pressure line (e.g., to a fluid pressure greater than 700 psi (4.826 kPa), e.g., a fluid pressure of 800 psi (5.516 kPa), and the outlet port 106 may be hydraulically coupled to a hydraulic actuator (e.g., a hydraulic actuator of a robot system). The high-pressure hydraulic fluid flowing from the inlet port 104 to the outlet port 106 can be used to move a piston in the hydraulic actuator in a first direction. The port 108 can be connected to a low-pressure line (e.g., to a hydraulic reservoir), and the inlet port 112 can be connected to a pressure line from the hydraulic actuator. At the same time that hydraulic fluid flows from the inlet port 104 to the outlet port 106 through the channel 126, hydraulic fluid may also flow from the inlet port 112 to the port 108 through the channel 128. The fluid at the port 108 can be discharged into the low-pressure line.

As illustrated in FIG. 3B, the fluid switch 114 can move in a second direction (which is opposite to the first direction) to a second position where the landing 130 covers the opening of the inlet port 104 (or is aligned with the opening of the inlet port 104), the landing 132 does not cover the opening of the port 108 (or is laterally displaced from the opening of the port 108), and the landing 134 does not cover the opening of the inlet port 110 (or is laterally displaced from the opening of the inlet port 110). In the second position, the inlet port 110 is fluidly coupled to the outlet port 112 by the channel 128 of the fluid switch 114 (as indicated by the arrow F), and the port 108 is fluidly coupled to the inlet port 106 (as indicated by the arrow G). The outlet port 112 can be hydraulically coupled to the hydraulic actuator (e.g., to deliver fluid pressure to move the piston in the hydraulic actuator in a second direction). In the second position, the inlet port 104 is fluidly isolated from the outlet port 106 by the landing 130 that covers the inlet port 104.

Herein, when one port is said to be fluidly isolated from another port (e.g., the inlet port 110 is fluidly isolated from the outlet port 112 in FIG. 3A), there may still be some leakage of hydraulic fluid between the ports (e.g., via the micro-gaps 146 and 152, the passages 204, 206, 208, 210, 212, and 214 in the fluid switch 114, the cavities 154, 156, and 158 in the valve housing 102, and the chamber 124 formed within the valve housing 102). In some examples, leakage can be controlled by a sizing of the micro-gaps 146 and 152 so that a magnitude of the leakage does not adversely affect the performance of the hydraulic valve 100. The micro-gaps 146, 152 are designed to form a hydrostatic bearing to support the fluid switch 114 within the chamber 124. The micro-gaps 146, 152 can be as small as possible without causing friction to develop between the two solid surfaces separated by the micro-gap.

In some examples, the stroke of the hydraulic valve 100 (e.g., the movement of the fluid switch 114 indicated by the arrows A and E in FIGS. 3A and 3B, respectively) along axis B-B can be about 200 micrometers (µm).

In some examples, single-acting implementations of the hydraulic valve 100 can have a single inlet port and a single outlet port (e.g., the hydraulic valve 100 can have only ports 104, 106). In some examples, there may optionally be a third port that can be hydraulically coupled to a hydraulic reservoir.

One advantage of the technology described herein is that a hydraulic valve (e.g., the hydraulic valve 100 in FIG. 1A) with a high-precision micro-gap is easier to manufacture than a conventional hydraulic valve (such as a spool valve) with a high-precision micro-gap.

Some implementations of the technology described herein can use rotational actuation instead of linear actuation. For example, instead of having the fluid switch 114 be a valve piston that slides back and forth as illustrated in FIGS. 3A and 3B, the fluid switch 114 can be a rocker or that can be rocked back and forth in clockwise and/or counterclockwise rotations about a pivot point.

FIGS. 4A-4L illustrate various aspects of an exemplary hydraulic valve 400 including a rotating fluid switch. In some examples, the hydraulic valve 400 includes a valve housing 402 having a chamber 412 and two or more ports (e.g., ports 404, 406, 436, 438). The hydraulic valve 400 includes a fluid switch 408 disposed within the chamber 412 and movable within the chamber 412. In this example, the fluid switch 408 is a rocker that can move between one position and another position by a rotational motion about an axis of rotation. The hydraulic valve 400 can include a fluid bearing (e.g., a hydrostatic bearing) that supports the fluid switch 408 (e.g., allows the fluid switch to float) within the chamber 412. In some examples, the fluid bearing includes hydraulic fluid (e.g., an oil such as peanut oil or mineral oil) in micro-gaps 414, 416 (see FIG. 4D) formed between opposing surfaces of the fluid switch 408 and the valve housing 402.

In some examples, the valve housing 402 is generally planar (e.g., opposing external surfaces of the valve housing 402 are generally parallel to each other). In the illustrated example, the valve housing 402 includes an input housing member 402a, a middle housing member 402b, and an output housing member 402c. The output housing member 402c can have a plate portion on which the middle housing member 402b and the input housing member 402a are stacked. The members 402a, 402b, 402c can be secured together using any suitable method. The middle housing member 402b includes a central opening forming the chamber 412 in which the fluid switch 408 is disposed. In some examples, the ports 404, 406 are formed in the input housing member 402a, and the ports 436, 438 are formed in the output housing member 402c. An inner surface of the input housing member 402a can form one end or surface of the chamber 412, and an inner surface of the output housing member 402 can form another end or surface of the chamber 412. Any method of sealing the interfaces between the housing members 402a, 402b and the housing members 402b, 402c can be used to prevent fluid leakage from the valve (e.g., gaskets can be arranged between the members 402a, 402b and 402b, 402c). In other examples, the valve housing 402 can be formed from fewer housing members (e.g., two housing members) or can be a unitary housing. For example, the middle housing member 402b can be integrally formed with either of the input and output housing members 402a, 402c. The valve housing 402 can be manufactured from a lightweight material such as aluminum or brass. The valve housing 402 can be manufactured by one or more of casting, molding, 3D printing, or machining.

Each of the ports 404 and 406 can be an inlet for a hydraulic fluid. In some implementations, one or both of the ports 404 and 406 is hydraulically coupled to a high-pressure inlet. In some implementations, the high-pressure inlet is hydraulically coupled to a hydraulic pump. In some implementations, in operation of the hydraulic valve 400, a fluid pressure at the inlet is at least 700 pounds per square inch (psi) (4.826 kPa). In an example implementation, the fluid pressure at the inlet is 800 psi (5.516 kPa). In some implementations, one or both of ports 404 and 406 is hydraulically coupled by a low-pressure line to a hydraulic reservoir. For example, port 406 may be hydraulically coupled to a high-pressure line, and port 404 may be hydraulically coupled to a low-pressure line. A respective hydraulic hose (not shown in FIGS. 4A-4L) can be attached at each of the ports 404 and 406 using a respective hydraulic fitting.

Figure 4A:
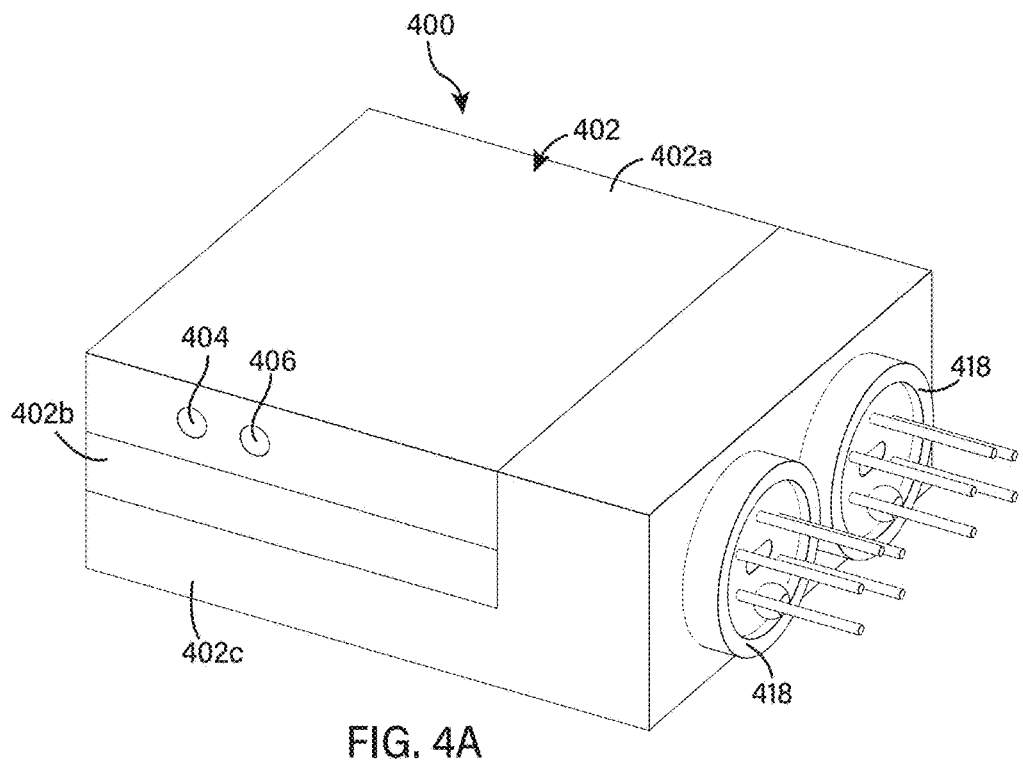
FIG. 4A is a perspective view of an example hydraulic valve with a rotational-displacement fluid switch.
Figure 4B:
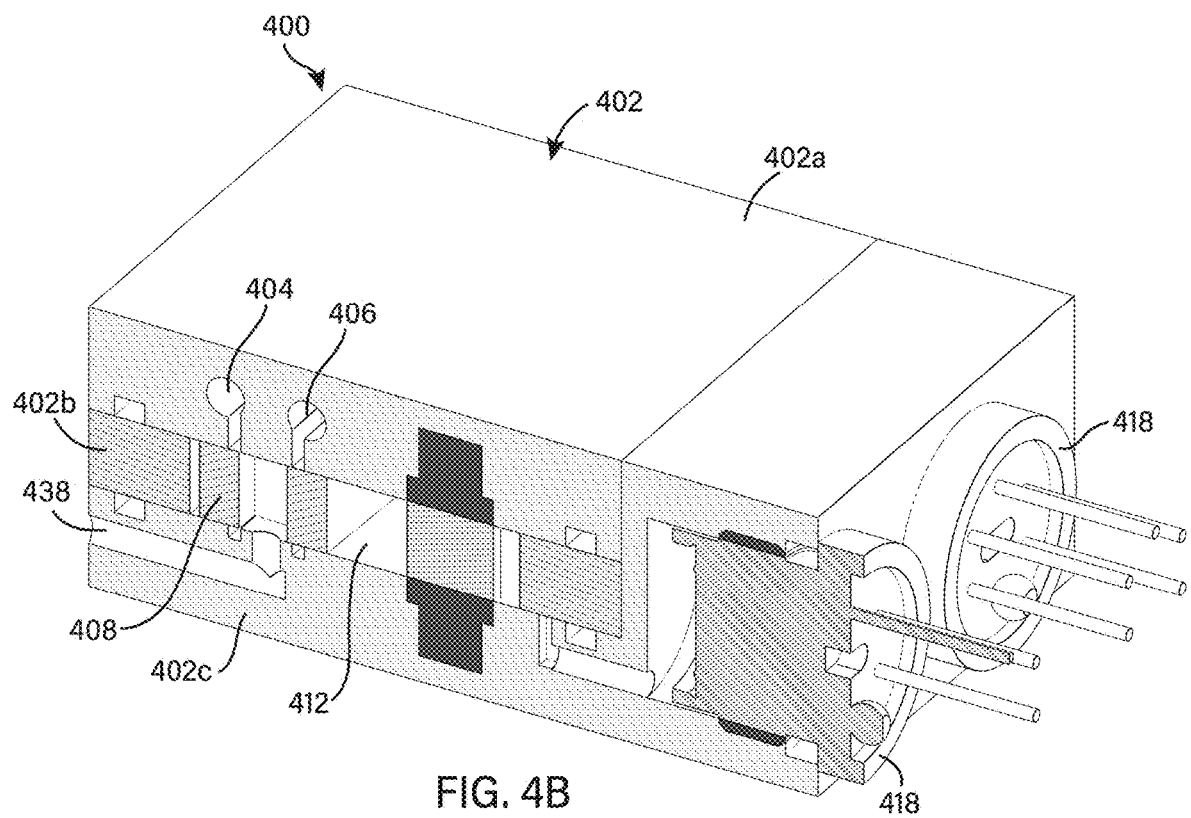
FIGS. 4B-4L are cross-sectional views of the hydraulic valve of FIG. 4A.
Figure 4C:
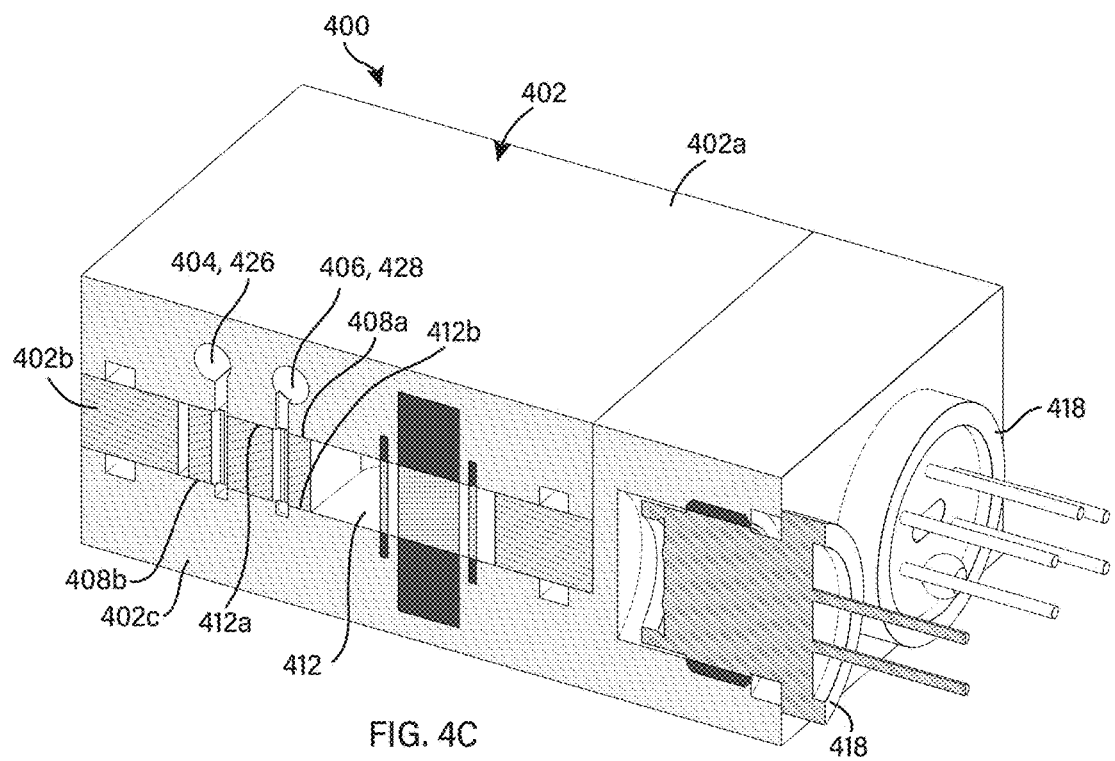
Figure 4D:
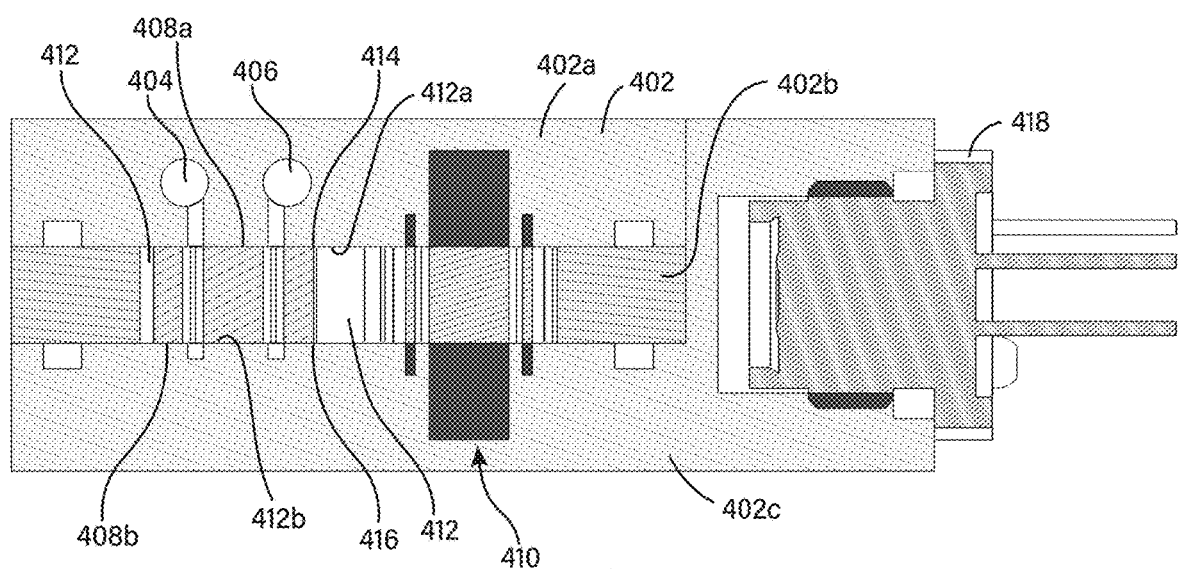
Figure 4E:
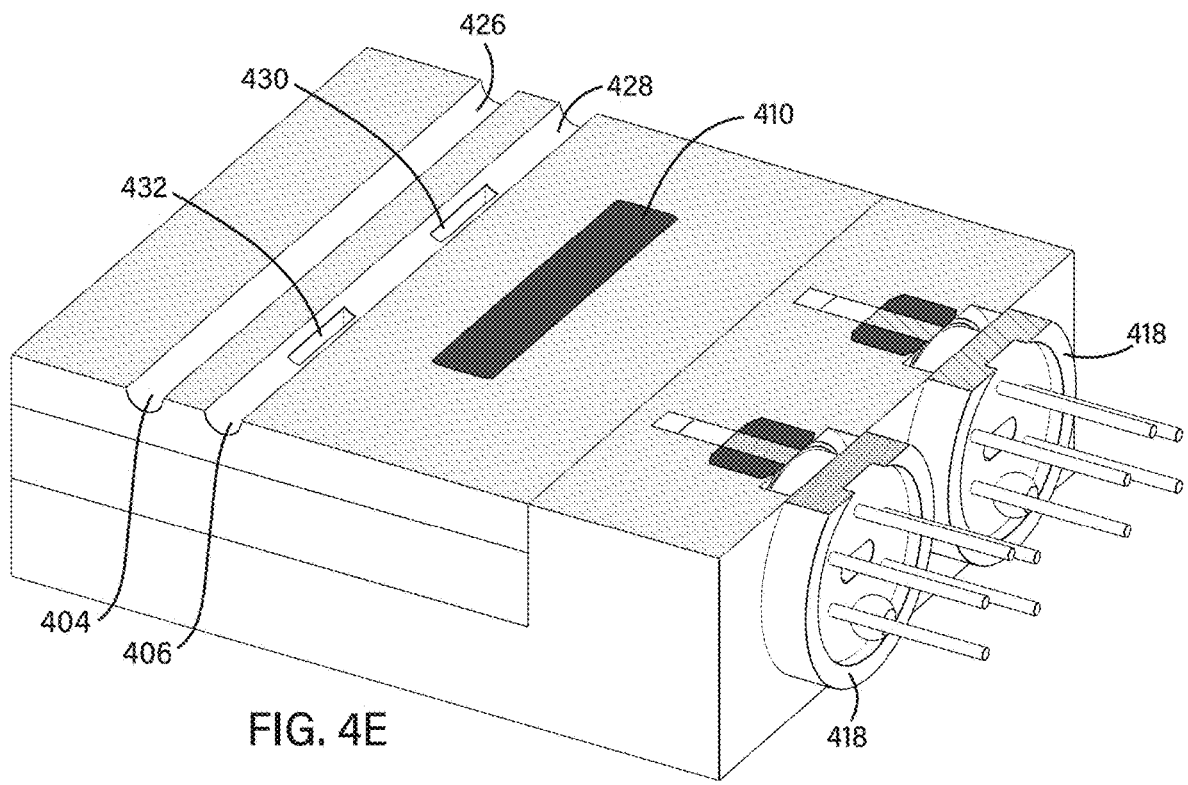
Figure 4F:
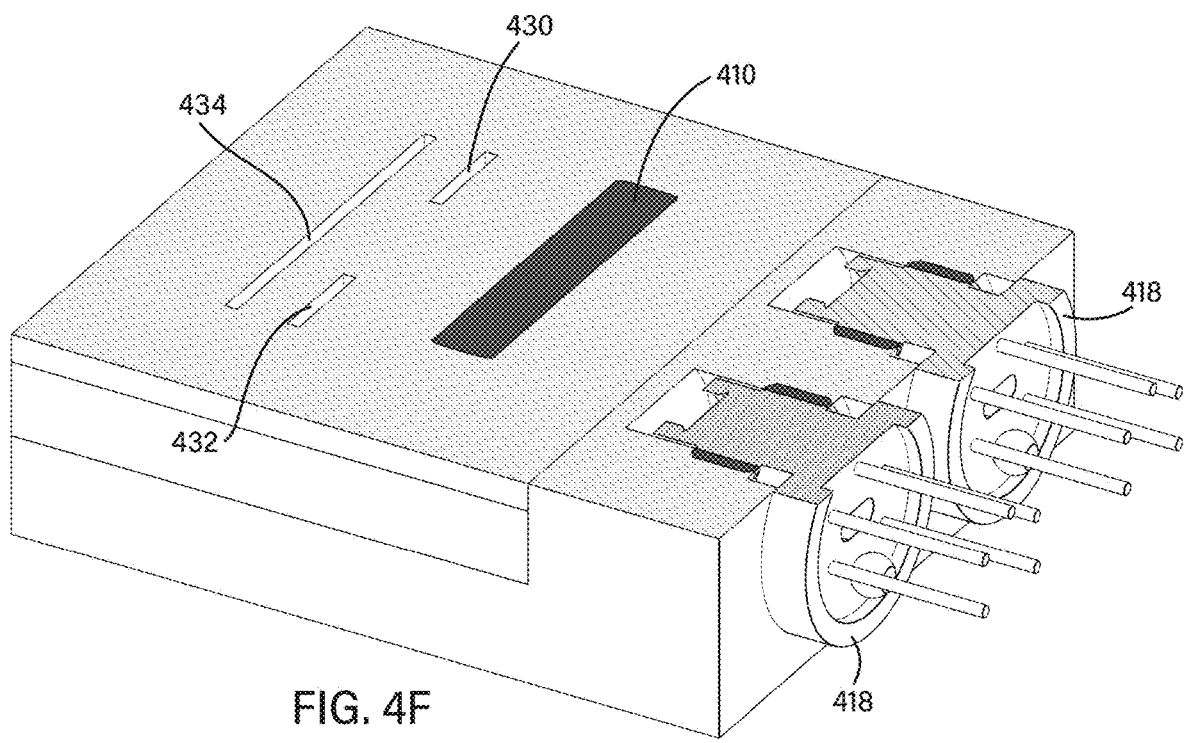
Figure 4G:
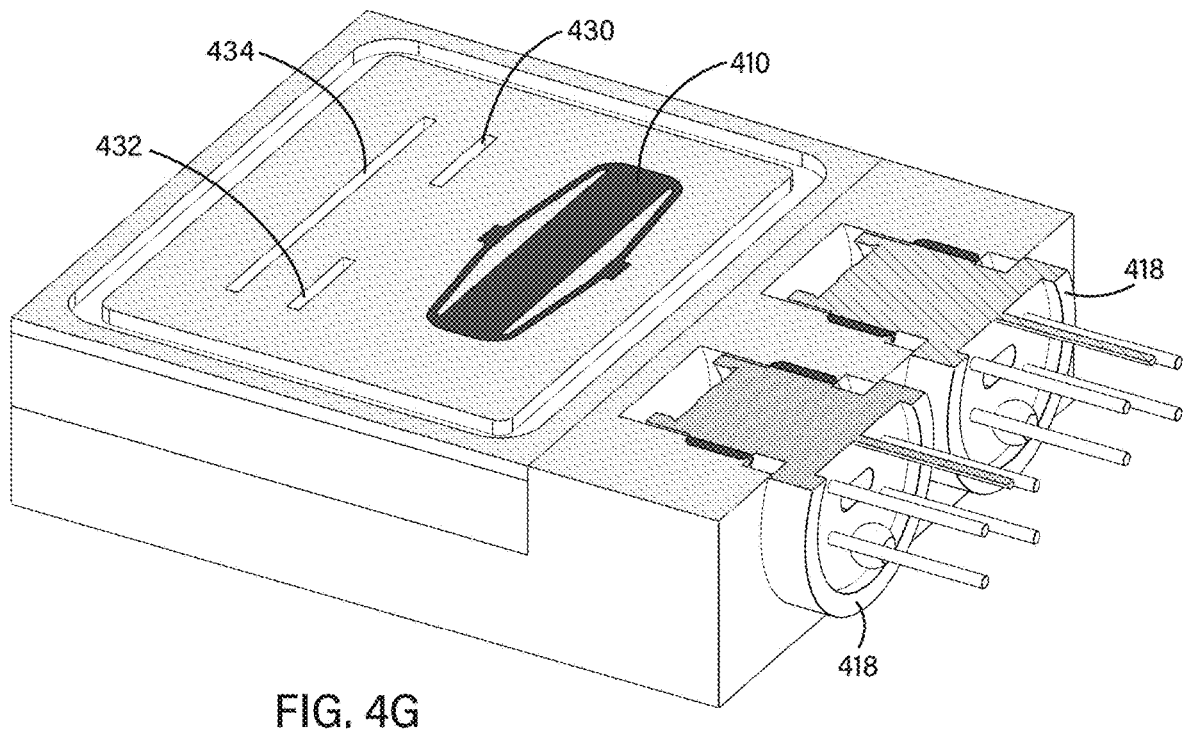
Figure 4H:
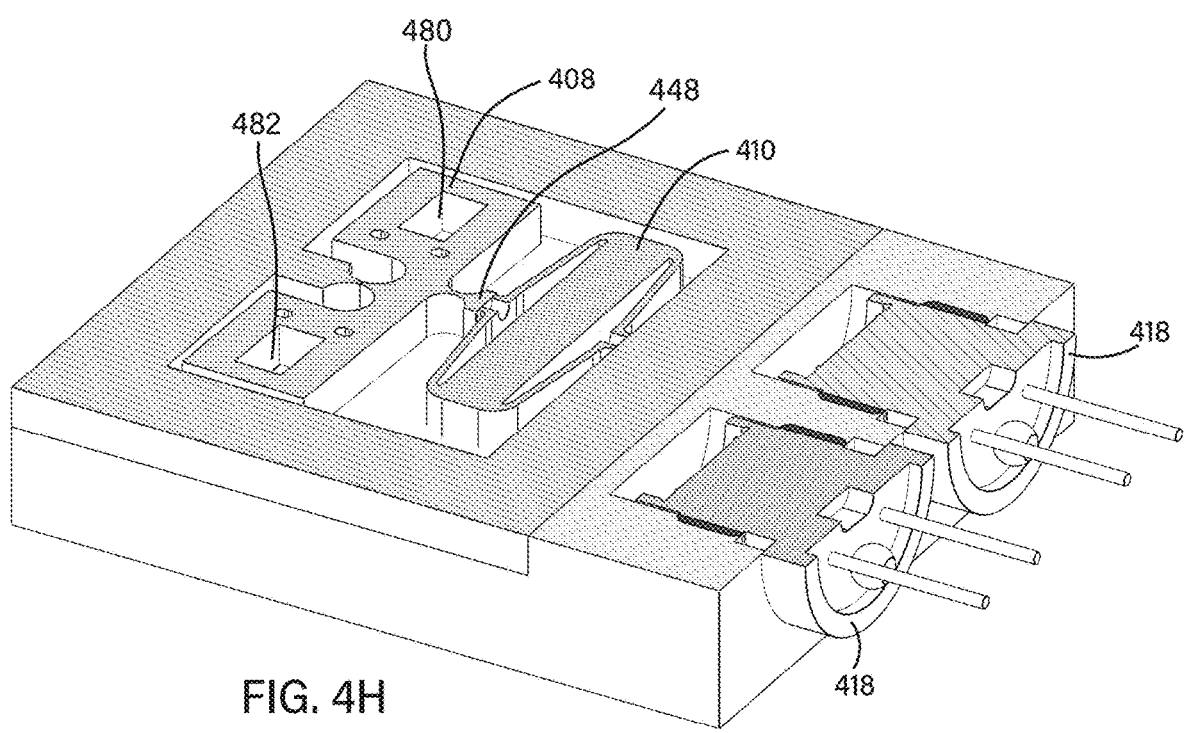
Figure 4I:
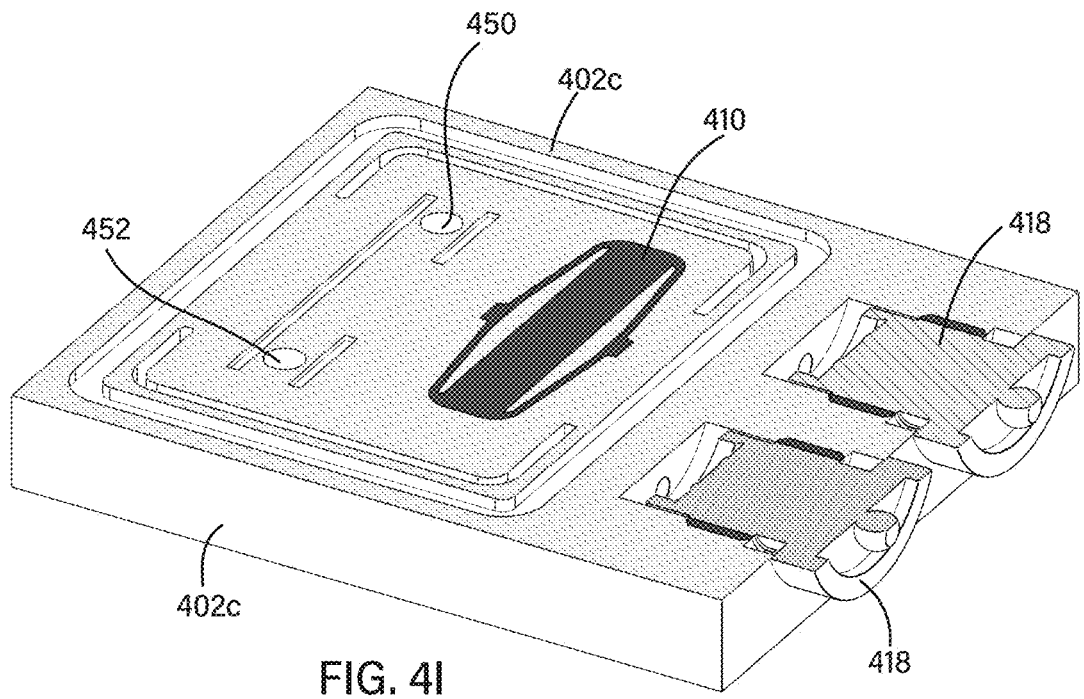
Figure 4J:
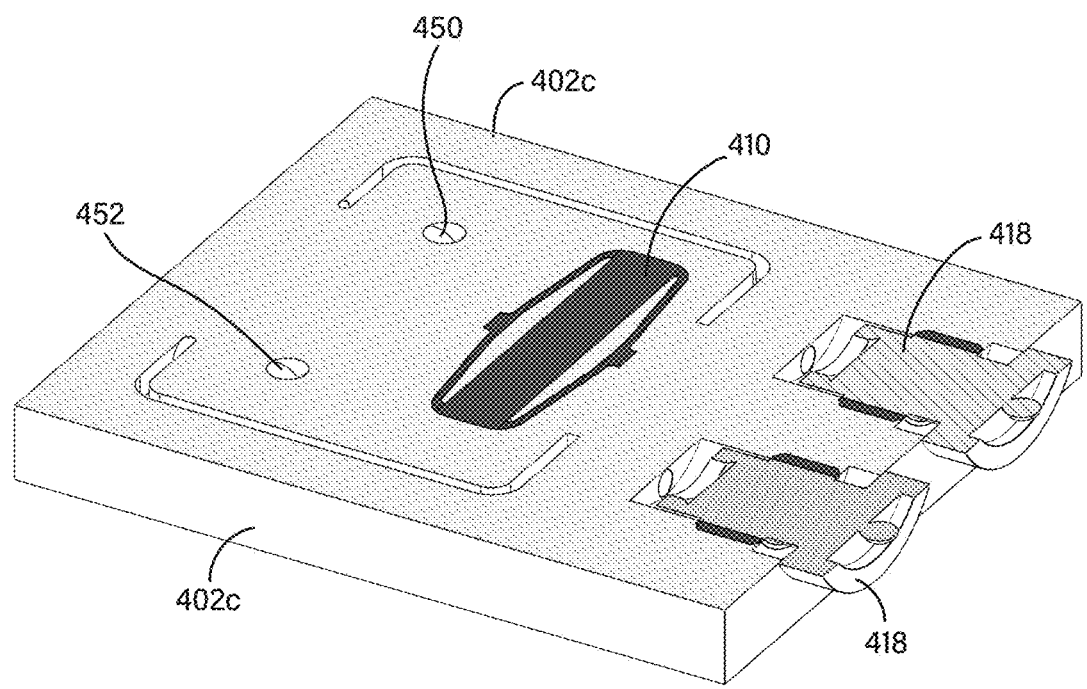

An external surface 408a of the fluid switch 408 (i.e., the upper surface of fluid switch 408) is separated from an inside surface 412a of the chamber 412 (or an inner surface of the input housing member 402a) by a micro-gap 414 (shown in FIG. 4D). In the present application, the term micro-gap refers to a gap having a size less than about 5 micrometers (µm) %". In one example, the micro-gap can have a size of approximately 0.5 µm or less. The external surface 408a is separated from the inside surface 412a only by the micro-gap 414. For example, there is no seal or gasket between the external surface and the inside surface.

Similarly, another external surface 408b of fluid switch 408 (i.e., the lower surface of fluid switch 408) is separated from another inside surface 412b of the chamber 412 (or an inner surface of the output member 402) by another micro-gap 416 (shown in FIG. 4D). The external surface 408b is separated from the inside surface 412b only by the micro-gap 416. For example, there is no gasket, seal (e.g., elastomer seal) or O-ring between the external surface and the inside surface. When filled with hydraulic fluid, the micro-gaps 414 and 416 can act as hydrostatic bearings, thereby reducing an actuation force used to operate the hydraulic valve 400. Leakage at the micro-gaps 414 and 416 is very small and essentially negligible (e.g., less than about 0.0001 LPM).

The micro-gaps 414 and 416 are fluidly coupled to the chamber 412 (e.g., the micro-gaps 414 and 416 are formed within the chamber 412). In some examples, the micro-gaps 414 and 416 can be fluidly coupled to each other. The chamber 412 can be at least partially filled with hydraulic fluid, which can provide counter-balancing of the fluid switch 408 as described with reference to FIG. 7A. In some examples, the micro-gaps 414, 416 can separate a fluid path through the hydraulic valve 400, as described with reference to FIGS. 7A, 7B, 8A, and 8B, from the chamber 412. Leakage of hydraulic fluid through the micro-gaps 414 and 416 can be reduced to an acceptable level as described herein.

The ports 404, 406 can be longitudinal channels 426, 428 (shown in FIG. 4E), respectively, formed in the input housing member 402a. The hydraulic valve 400 can include passages (or slots) 430, 432, 434 formed in the input housing member 402. The passages 430, 432 are fluidly connected to the channel 428 (or port 406). The passage 434 is fluidly connected to the channel 426 (or port 404). The passages 430, 432 can be inlet passages hydraulically coupled to a high pressure line (e.g., a line from a hydraulic pump). The passage 434 can be hydraulically coupled to a low-pressure line (e.g., a line to a hydraulic reservoir).

Figure 4K:
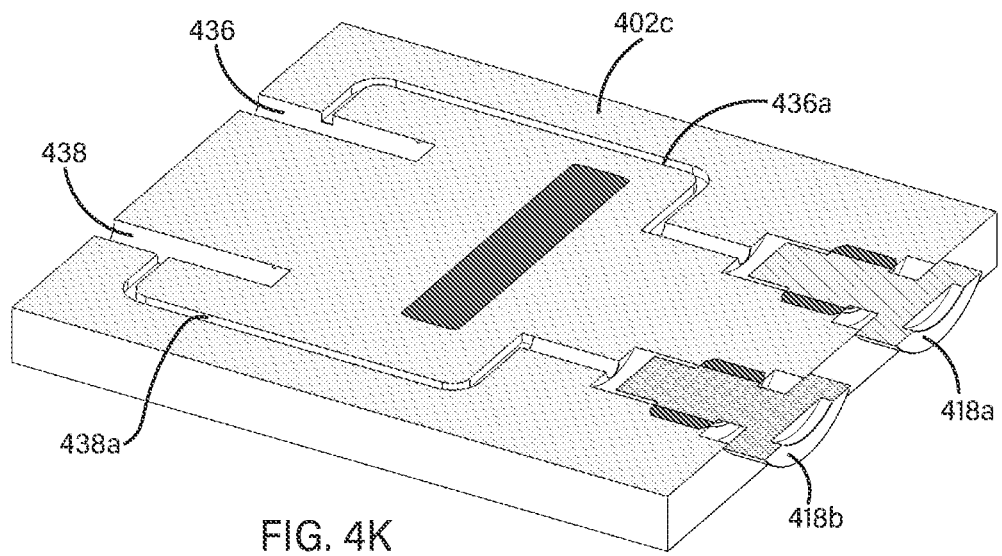

In some examples, the hydraulic valve 400 can include one or more pressure sensors 418 to measure pressure in the chamber 412. The pressure measurements can be used as part of the control of the hydraulic valve 400. As shown in FIG. 4K, the hydraulic valve 400 can include ports 436 and 438 formed in the output housing member 402c. A pressure sensor 418a can communicate with the port 436 via a flow path 436a and measure the pressure in the port 436. A pressure sensor 418b can communicate with the port 438 via a flow path 438a and measure the pressure in the port 438.

Figure 4L:
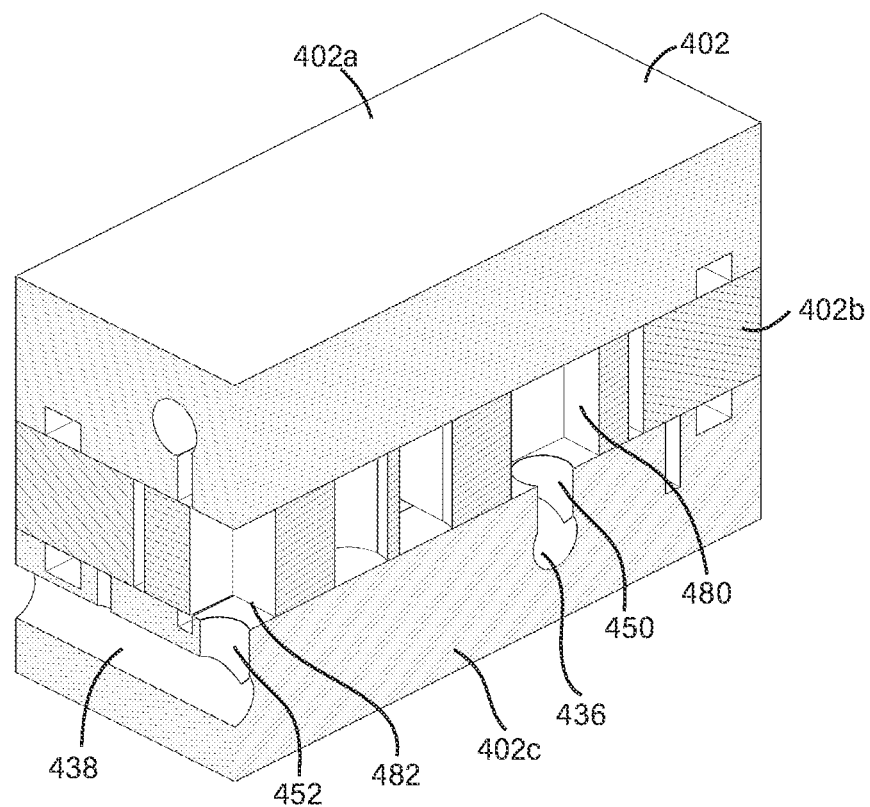

As shown in FIG. 4L, the hydraulic valve 400 can include channels 450, 452 formed in the output housing member 402c and fluidly connected to the ports 436, 438, respectively. The fluid switch 408 includes channels 480, 482. When the fluid switch 408 is disposed within the chamber 412, the channel 480 overlaps the channel 450 and is fluidly connected to the channel 450. Similarly, the channel 482 overlaps the channel 452 and is fluidly connected to the channel 452.

In some examples, the ports 404 and 406 (see FIG. 4B) can be inlet ports. The port 438 (see FIG. 4B) and port 436, 436 (see FIG. 4K) can be outlet ports. Each of the ports 436, 438 can be an outlet for a hydraulic fluid and may be hydraulically coupled to a respective actuation piston of a hydraulic actuator. In operation of the hydraulic valve 400, when the hydraulic valve 400 is open, a hydraulic fluid (e.g., an oil such as peanut oil or mineral oil) can flow through the fluid switch 408 from the inlet port (port 404 or port 406) to the outlet port 438.

In an example operation, when the hydraulic valve 400 is open, hydraulic fluid can flow from the port 406, through the channel 480 of the fluid switch 408, to the outlet 436. At the same time, hydraulic fluid can also flow from the outlet 438, through the channel 482 of the fluid switch 408, to the port 404, and then discharged to a hydraulic reservoir hydraulically coupled to the port 404.

Figure 5A:
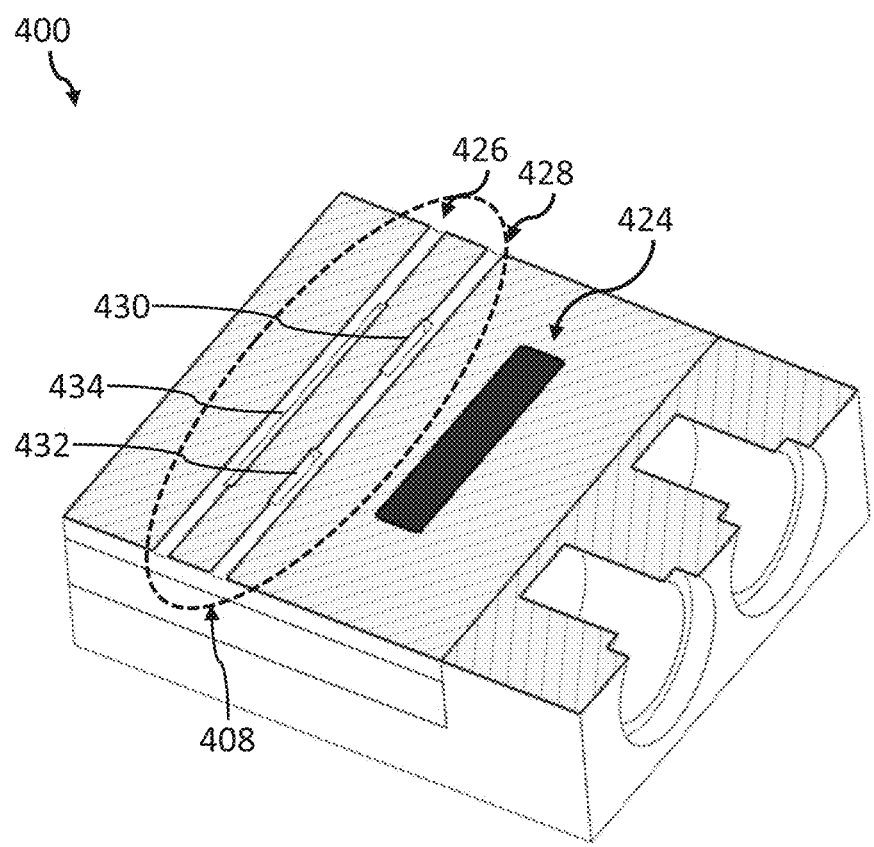
FIGS. 5A and 5B are perspective cross-sectional views of the hydraulic valve of FIG. 4A.
Figure 5B:
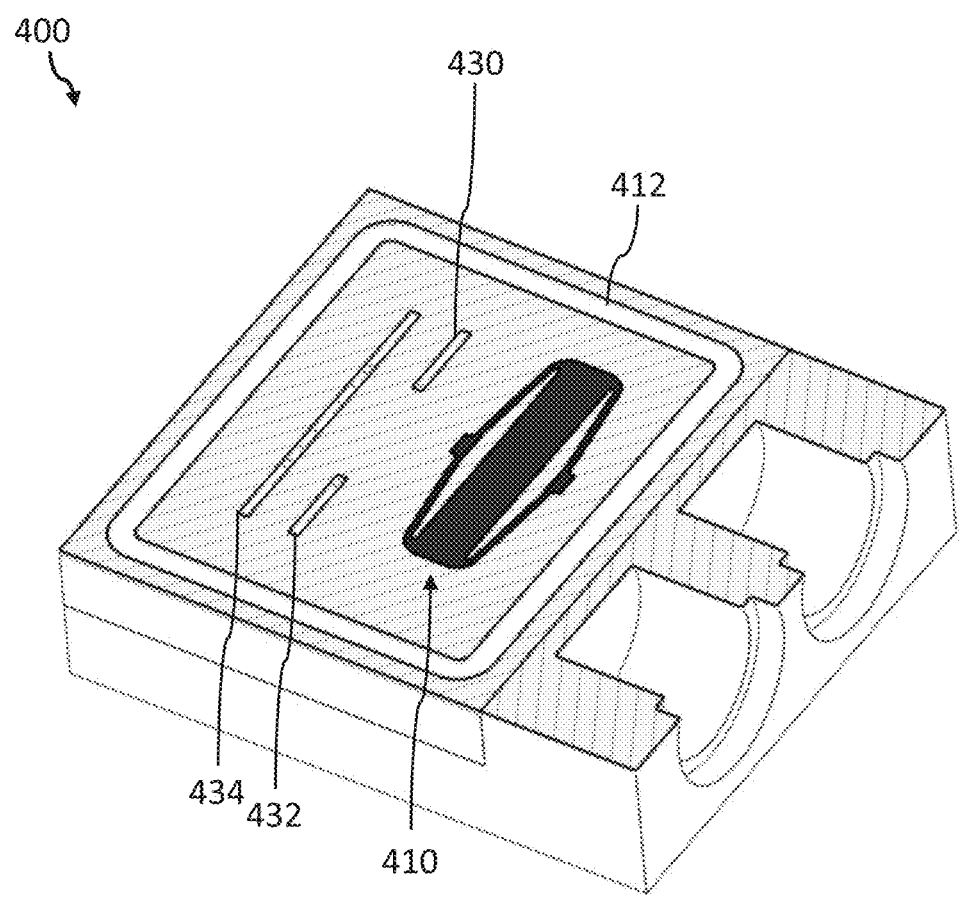

The hydraulic valve 400 can include an actuator 410 coupled to the fluid switch 408 and operable to rotate the fluid switch 408 within the chamber 412. The actuator 410 can actuate the fluid switch 408 to allow a flow of hydraulic fluid through the fluid switch 408 and/or to restrict a flow of hydraulic fluid through the fluid switch 408. In some examples, the actuator 410 is arranged within the chamber 412. In some examples, the actuator 410 can be a piezo actuator (e.g., an amplified piezoelectric actuator). The hydraulic valve 400 can include an actuator cavity 424 (shown in FIGS. 5A-5B). The actuator cavity 424 may be used, for example, for wiring to the actuator 410.

Figure 6:
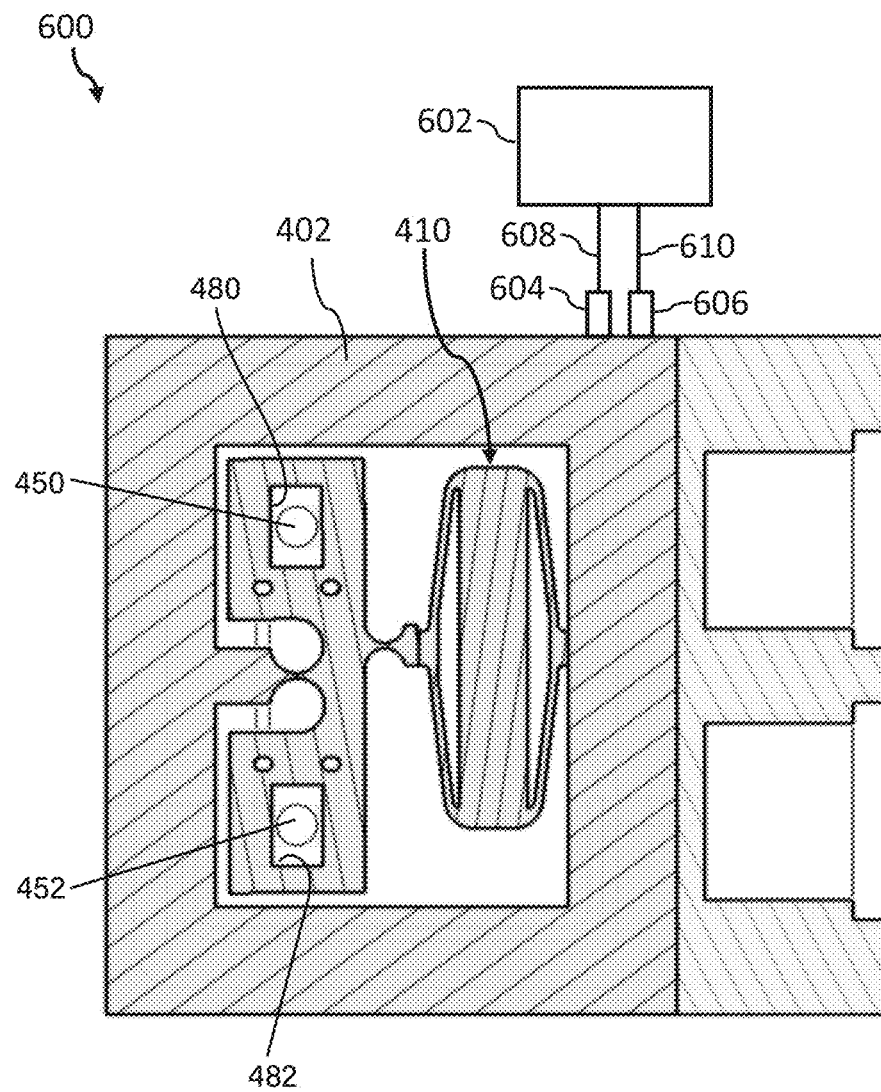
FIG. 6 is schematic diagram of a hydraulic control system including the hydraulic valve of FIG. 4A.

FIG. 6 is a schematic diagram of a hydraulic control system 600 and an electrical system 602 for the hydraulic valve 400. In some examples, the electrical system 602 is electrically coupled to the actuator 410 through electrical feedthroughs 604, 606 attached to the valve housing 402.

The electrical system 602 is operable to send one or more electrical signals to the actuator 410. The actuator 410 is operable to receive the one or more electrical signals from the electrical system 602. In some examples, the one or more electrical signals can cause an actuation of the actuator 410 by at least one of an expansion and a contraction of piezoelectric material in the actuator 410.

Figure 7A:
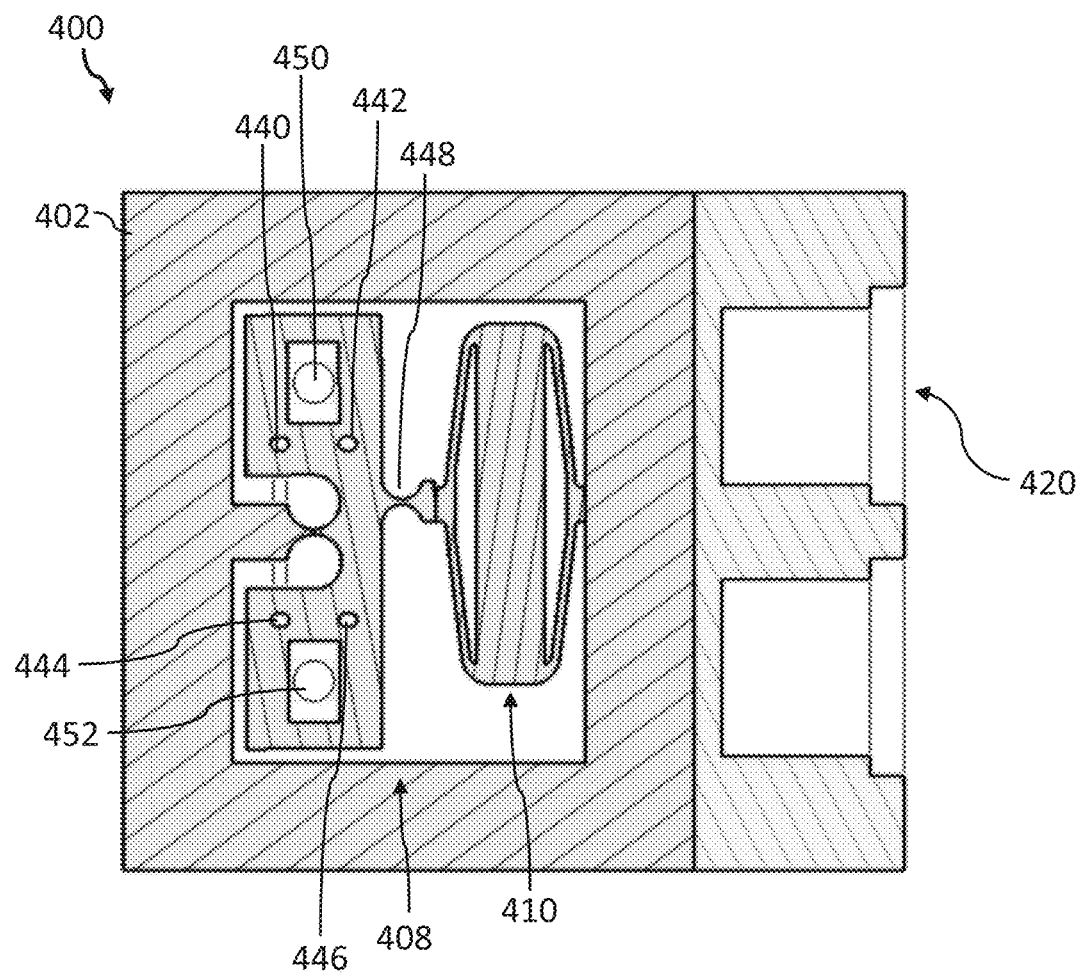
FIGS. 7A and 7B are cross-sectional views of the hydraulic valve of FIG. 4A showing the fluid switch.
Figure 7B:
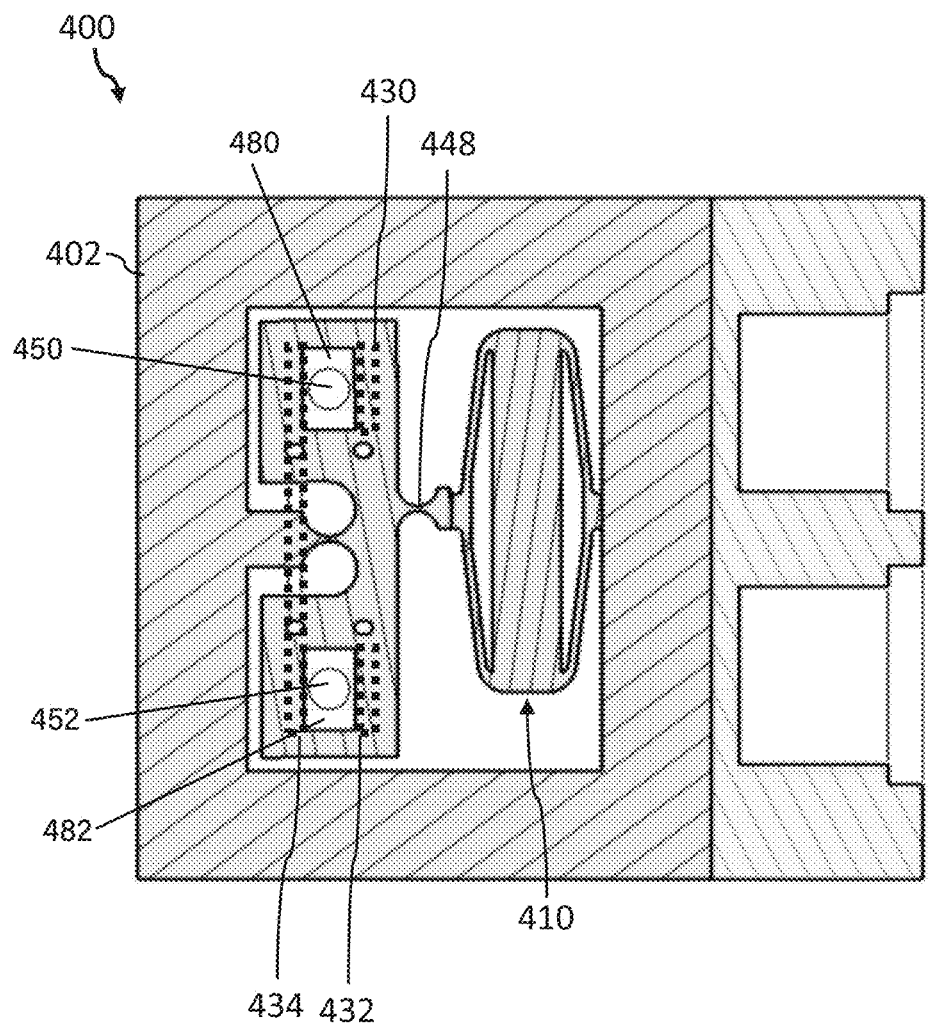

Referring to FIGS. 7A-7B, the fluid switch (rocker) 408 includes passages 440, 442, 444, and 446. Each of the passages 440, 442, 444, and 446 extends from at least a portion of the external surface 408a of the fluid switch 408 to at least a portion of the external surface 408b of the fluid switch 408. Passages 440, 442, 444, and 446 can fluidly couple the micro-gaps 414, 416 through the fluid switch 408 to keep the forces applied to both sides of the fluid switch 408 relatively balanced as described for the fluid switch 114, thereby enabling the fluid switch 408 to float in the chamber 412 and keeping the micro-gaps 414 and 416 at least approximately even and at least approximately constant.

The hydraulic valve 400 has a pivot point 448 between the fluid switch (rocker) 408 and the actuator 410. Expansion and/or contraction of piezoelectric material in the actuator 410 can cause the fluid switch 408 to rock back and forth at the pivot point 448. In some examples, the pivot point 448 is off-center (e.g., the distance between the pivot point 448 and the channel 480 is smaller than the distance between the pivot point 448 and the channel 482.

The fluid switch 408 includes channels 480 and 482. In operation, hydraulic fluid can flow through the channels 480 and 482 from an inlet of the hydraulic valve 400 to an outlet, or can be restricted from flowing, depending on a position of the fluid switch 408.

Figure 8A:
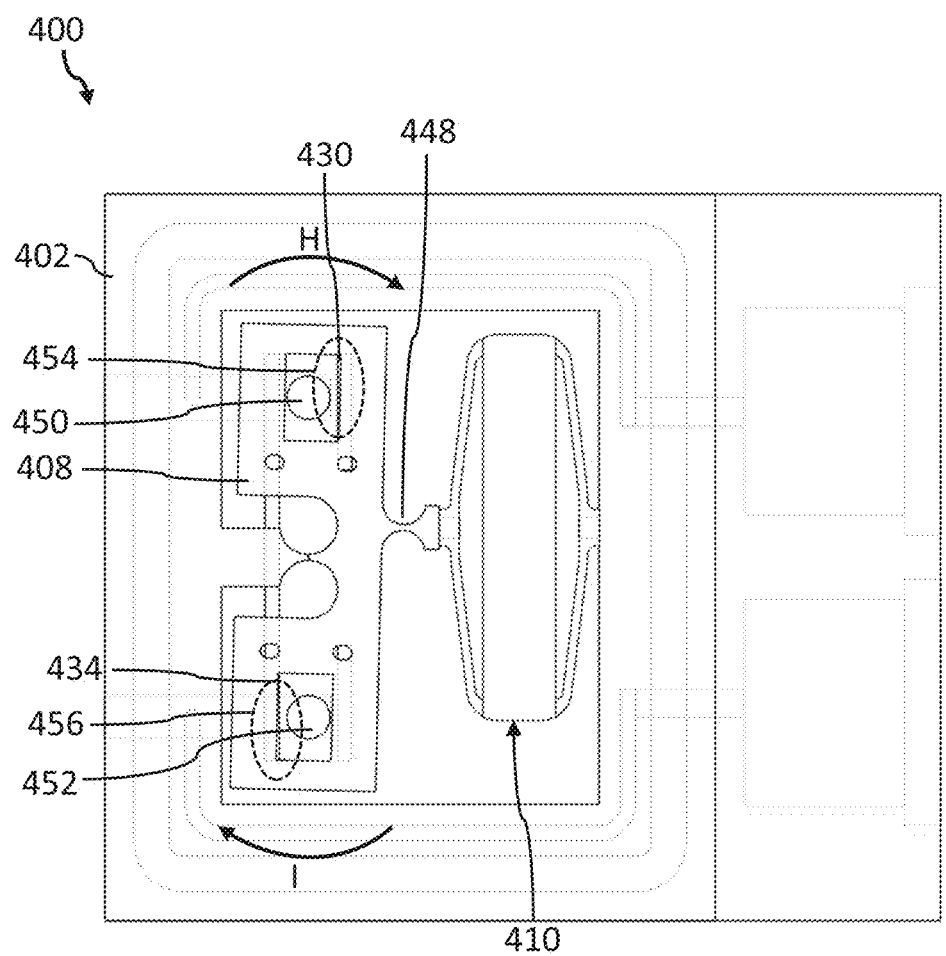
FIGS. 8A and 8B are cross-sectional views showing different positions of the fluid switch of the hydraulic valve of FIG. 4A.
Figure 8B:
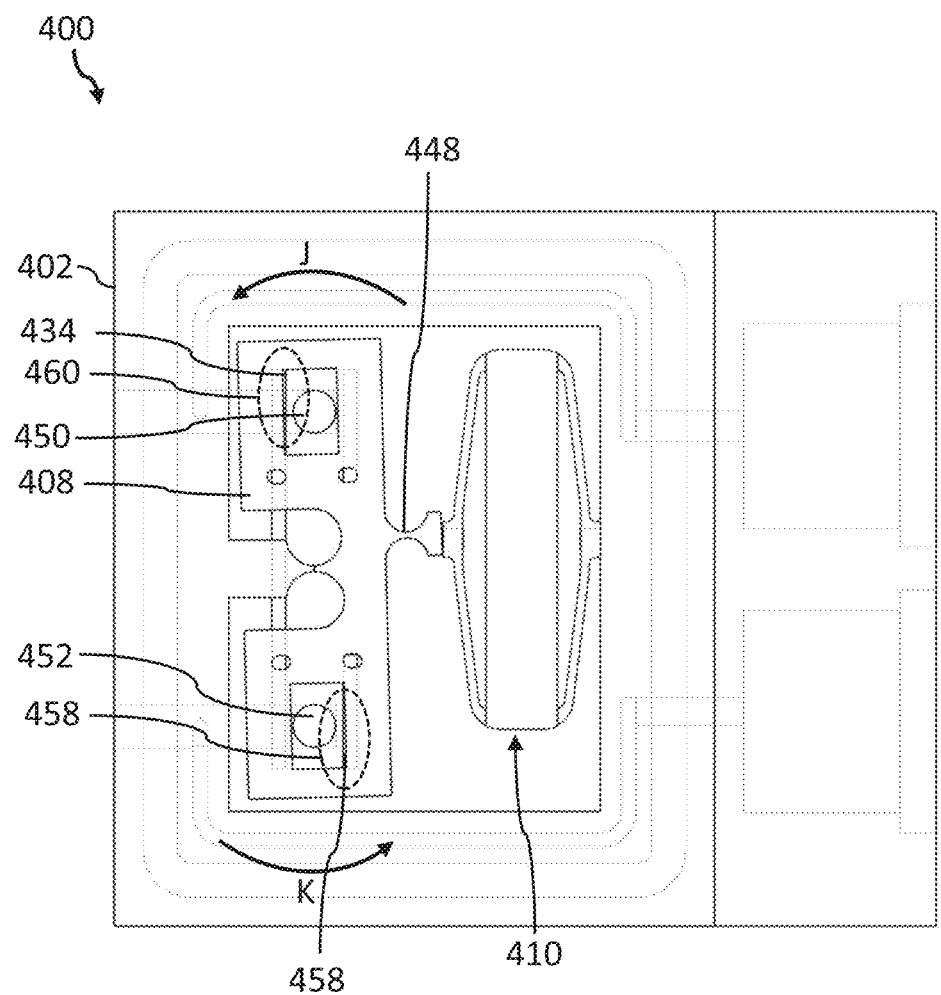

FIGS. 8A and 8B are cross-sectional views showing different positions of the fluid switch 408 of the hydraulic valve 400 of FIG. 4A.

In FIG. 8A, the fluid switch 408 is rotated clockwise about pivot point 448 (as indicated by arrows H and I). In this position, the inlet slot 430 (shown in FIG. 5B) at least partially overlaps with the channel 450. The overlap is shown by dashed ellipse 454. The slot 434 at least partially overlaps with the channel 452. The overlap is shown by dashed ellipse 456. In this position of the fluid switch 408, in operation, hydraulic fluid can flow into hydraulic valve at port 406 along channel 428 (shown in FIG. 5A), through channel 450, and exiting the hydraulic valve 400 at the outlet 436.

In FIG. 8B, the fluid switch 408 is rotated counter-clockwise about the pivot point 448 (as indicated by arrows J and K). In this position, the inlet slot 432 (shown in FIG. 5B) at least partially overlaps with the channel 452. The overlap is shown by dashed ellipse 458. Slot 434 at least partially overlaps with the channel 450. The overlap is shown by dashed ellipse 460. In this position of the fluid switch 408, in operation, hydraulic fluid can flow into hydraulic valve at the outlet 438 along the channel 426, through the channel 452, and exiting hydraulic valve 400 at the port 404.

In the example illustrated in FIGS. 4A-8B, the hydraulic valve 400 is a double-acting hydraulic valve, and the hydraulic valve 400 can have two inlets and two outlets. Other implementations of the hydraulic valve can be single-acting, and the hydraulic valve can have only one inlet and one outlet. Both single-acting and double-acting hydraulic valves may optionally have a low-pressure line to a hydraulic reservoir, as described for the hydraulic valve 100 of FIG. 1A and the hydraulic valve 400 of FIG. 4A.

Figure 9:
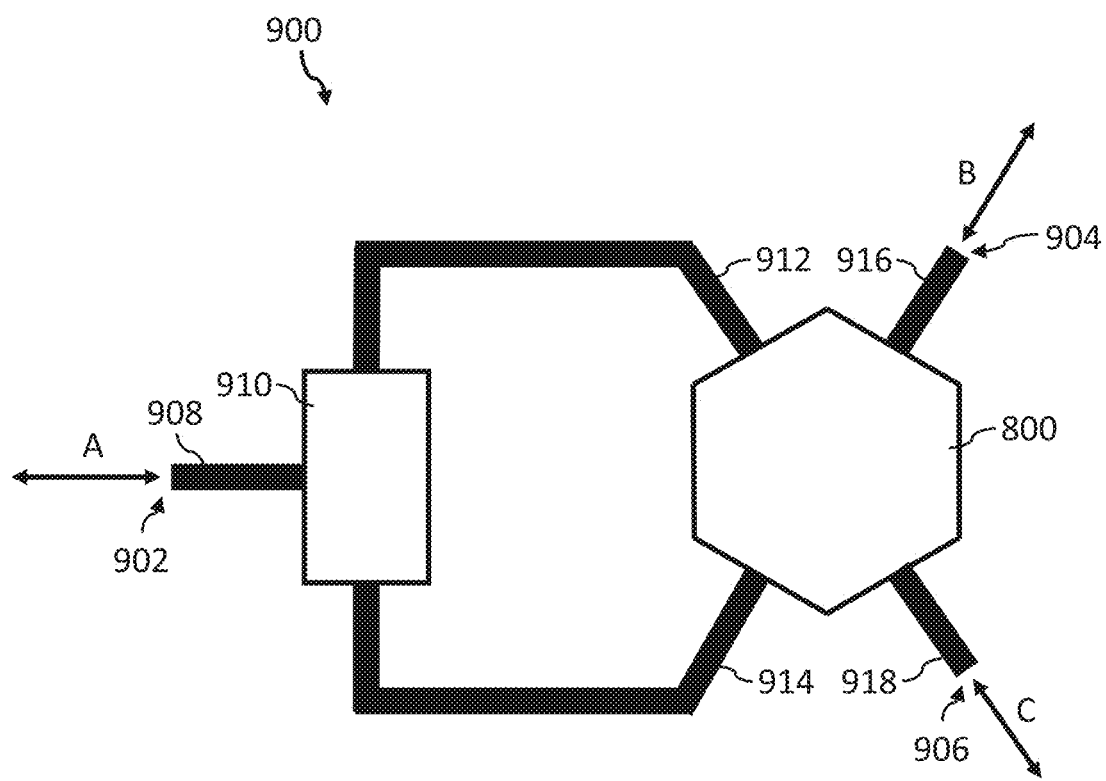
FIG. 9 is a schematic diagram of a hydraulic circuit including the hydraulic valve of FIG. 1A or the hydraulic valve of FIG. 4A.

FIG. 9 illustrates a hydraulic circuit 900 including ports 902, 904, and 906 through which a hydraulic fluid may flow in and/or out of the hydraulic circuit 900 as indicated by arrows A, B, and C, respectively.

In some implementations, a hydraulic hose 908 hydraulically couples the port 902 to an actuator (not shown in FIG. 9). In some implementations, the actuator is an actuation piston. The hydraulic circuit 900 includes a splitter 910 operable to direct a flow of hydraulic fluid via the hydraulic hoses 912 and 914 to the hydraulic valve 800, and vice versa. The splitter 910 is a T-intersection where the hydraulic hoses 908, 912, and 914 meet.

In some implementations, the port 904 is an inlet, and hydraulic fluid can flow into the hydraulic circuit 900 at the port 904. In some implementations, a hydraulic hose 916 hydraulically couples the port 904 of the hydraulic valve 800 to an accumulator (not shown in FIG. 9).

In some implementations, the port 906 is an outlet, and the hydraulic fluid can flow out of the hydraulic circuit 900 at the port 906. In some implementations, a hydraulic hose 918 hydraulically couples the port 906 of the hydraulic valve 908 to a reservoir for a hydraulic pump (the reservoir and the hydraulic pump not shown in FIG. 9).

In some implementations, during operation, the hydraulic valve 800 can control a pressure to an actuation piston by allowing hydraulic fluid to flow from the accumulator via the port 904 and the hydraulic hoses 916, 914, and 908, while simultaneously preventing an exhaust flow from the actuator to the reservoir via the port 906 and the hydraulic hoses 908, 912, and 918. In this mode of operation, hydraulic fluid flows through the hydraulic valve 800 and out of the hydraulic circuit 900 to the actuation piston via the splitter 910 and the hydraulic hose 908.

Similarly, the hydraulic valve 800 can control an exhaust from the actuation piston by allowing hydraulic fluid to flow to the reservoir via the port 906 and the hydraulic hoses 908, 912, and 918, while simultaneously preventing a pressure flow from the accumulator via the port 904 and the hydraulic hoses 916, 914, and 908. In this mode of operation, hydraulic fluid flows into the hydraulic circuit 900 from the actuation piston via the hydraulic hose 908 and the splitter 910, and through the hydraulic valve 800 to the reservoir.

In the illustrated example implementations of FIGS. 8 and 9, the hydraulic valve 800 of the hydraulic circuit 900 includes two channels per valve to control pressure and exhaust of pistons. In other implementations, hydraulic valves include a single channel per valve. In other implementations, hydraulic valves include more than two channels per valve.

Figure 10:
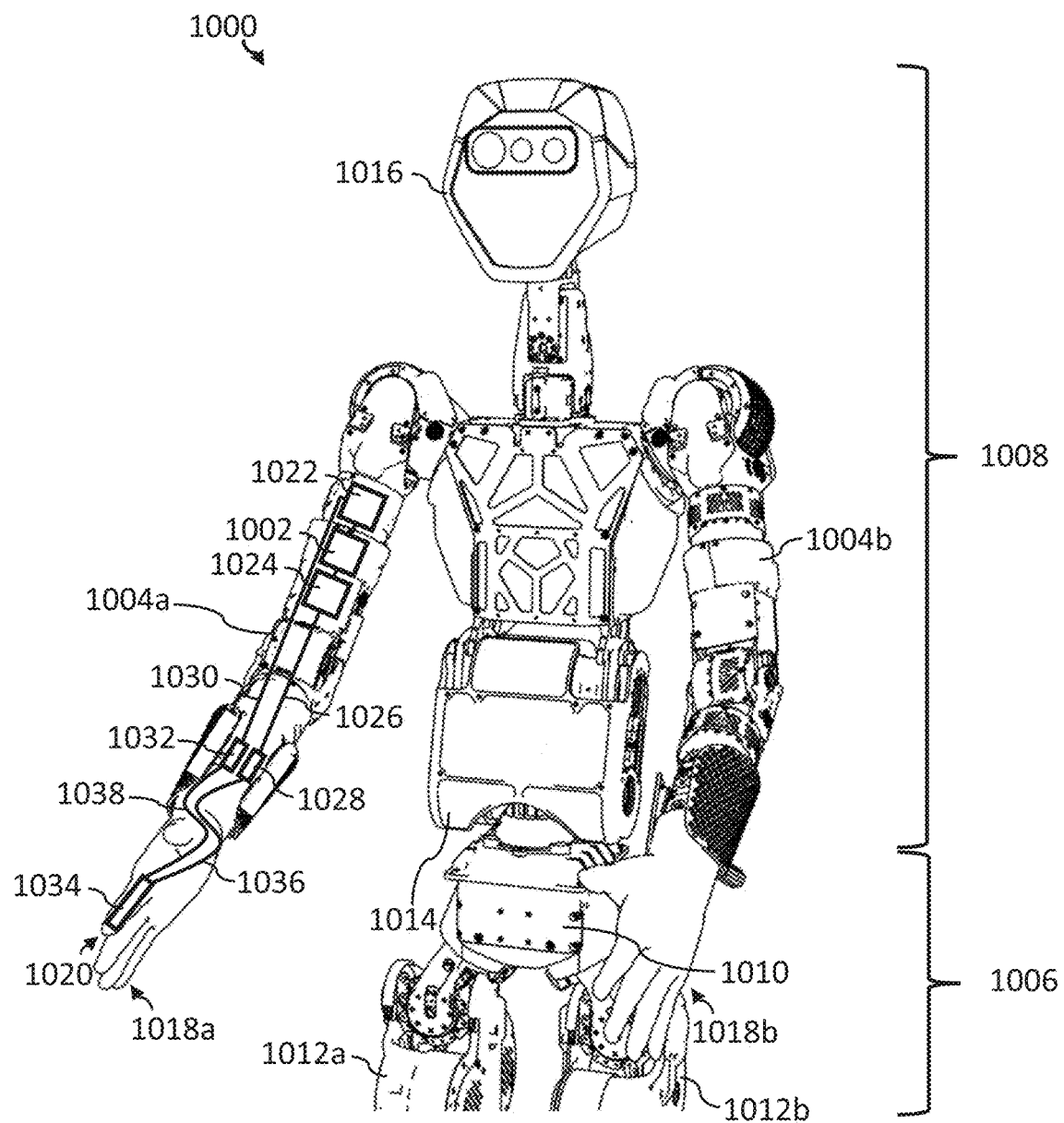
FIG. 10 is a schematic drawing of an example hydraulically-powered robot.

FIG. 10 is an example of a hydraulically-powered robot 1000 with elements of a hydraulic system (including a hydraulic valve e.g., the hydraulic valve 100 of FIG. 1A or hydraulic valve 400 of FIG. 4, and a hydraulic pump 1002) integrated with an arm 1004a of the robot 1000.

The robot 1000 comprises a base 1006 and a humanoid upper body 1008. The base 1006 comprises a pelvic region 1010 and two legs 1012a and 1012b (collectively referred to as legs 1012). Only the upper portion of legs 1012 is shown in FIG. 10. In other examples, the base 1006 may include a stand and (optionally) one or more wheels.

The upper body 1008 includes a torso 1014, a head 1016, a right-side arm (or robotic arm) 1004a, and a left-side arm (or robotic arm) 1004b, and a right hand (or end effector) 1018a, and a left hand (or end effector) 1018b. The arms 1004a, 1004b are humanoid arms. In other examples, the arms 1004a, 1004b can have a form factor that is different from a form factor of a humanoid arm.

The hands 1018a, 1018b are humanoid hands. In other examples, the hands 1018a, 1018b can have a form factor that is different from a form factor of a humanoid hand. Each of the hands 1018 includes one or more digits (e.g., digit 1020 of hand 1018a). Digits may include fingers, thumbs, or similar structures of the hand or end effector.

In some implementations, the base 1004 and/or torso 1014 of the upper body 1008 can house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of the robot 1000 can include a hydraulic pump 1002, a reservoir 1022, and an accumulator 1024, housed in arm 1004a. A hose 1026 provides a hydraulic coupling between the accumulator 1024 and a pressure valve 1028 of the hydraulic control system. A hose 1030 provides a hydraulic coupling between an exhaust valve 1032 of the hydraulic control system and reservoir 1022.

A pressure valve 1028 is hydraulically coupled to an actuation piston 1034 by a hose 1036. An actuation piston 1034 is hydraulically coupled to an exhaust valve 1032 by a hose 1038. The hoses 1026 and 1036 and pressure valve 1028 provide a forward path to actuation piston 1034. The hoses 1030 and 1038 and exhaust valve 1032 provide a return path to the actuation piston 1034. The pressure valve 1028 and exhaust valve 1032 can control the actuation piston 1034 and can cause the actuation piston 1034 to move, which can cause a corresponding motion of at least a portion of the hand 1018a, for example, digit 1020.

In some implementations, the pressure valve 1028 and exhaust valve 1032 are electrohydraulic servo valves controlled by a controller (not shown in FIG. 10). The electrohydraulic servo valves are also referred to in the present application as servo valves and servo-controlled valves. The controller may be implemented by any suitable combination of hardware, software, and/or firmware. The controller may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 1000, for example, in hand 1018a. When the drive piston is driven by the motor, the actuation piston can be forced to move, which can cause a corresponding motion of at least a portion of robot 1000.

In some implementations, the hydraulic fluid in the hoses of FIG. 10 (including hoses 1026, 1030, 1036, and 1038) is an oil, for example, peanut oil or mineral oil.

Each of the hands 1018a, 1018b may have more than one degree of freedom (DOF). In some implementations, each hand has up to eighteen (18) DOFs. Each DOF can be driven by a respective actuation piston (for example, actuation piston 1034). For clarity of illustration, only one actuation piston is shown in FIG. 10. Each actuation piston may be located in hands 1018.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 1018a, 1018b to control eighteen (18) DOFs of each hand. In some implementations, at least some of the hoses shown in FIG. 10 (e.g., the hoses 1026, 1030, 6310, and 1038) belong to a bundle of hoses that can accommodate twenty (20) one-eighth inch (⅛ in.) hoses.

In some implementations, a robot with an integrated hydraulic system, such as robot 1000 of FIG. 10, may employ any or all of the teachings of U.S. patent application Ser. No. 17/749,536, U.S. patent application Ser. No. 17/833,998, U.S. patent application Ser. No. 17/863,333, U.S. patent application Ser. No. 17/867,056, U.S. patent application Ser. No. 17/871,801, U.S. patent application Ser. No. 17/976,665, and/or U.S. Provisional Patent Application Ser. No. 63/428,997, all of which are incorporated herein by reference in their entirety.

Though the example implementation of FIG. 10 of a hydraulically-powered robot with only a single hydraulic system, a person of skill in the art will appreciate that a hydraulically-powered robot may include multiple hydraulic systems. In some implementations, at least some of the multiple hydraulic systems are hydraulically-isolated from one another. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot (especially internally, as in robot 1000). A hydraulic system dedicated to a single component or device, or dedicated to a subset of the multiple components or devices, may be more localized, and more readily adapted to fit within a desired form factor.

Hydraulic valve 100 of FIG. 1A and/or hydraulic valve 400 of FIG. 4A can be used in the hydraulic control system of robot 1000 to control a flow of hydraulic fluid in the hydraulic control system. Hydraulic valve 100 of FIG. 1A and/or hydraulic valve 400 of FIG. 4A can be used, for example, in pressure valve 1028 and/or exhaust valve 1032.

In some implementations, pressure valve 1028 and exhaust valve 1032 can be replaced by a single hydraulic valve having two channels (e.g., hydraulic valve 100 of FIG. 1A and/or hydraulic valve 400 of FIG. 4A). A two-channel hydraulic valve can be used to control pressure and exhaust flows to/from an actuation piston (e.g., as described with reference to FIG. 9).

Hydraulic valves 100 and 400 can be more compact than other types of hydraulic valves, and can be beneficially deployed in restricted spaces and/or in situations where there are a large number of hydraulic connections to be made. Hydraulic valves 100 and 400 are also more serviceable than other types of hydraulic fitting.

Figure 11:
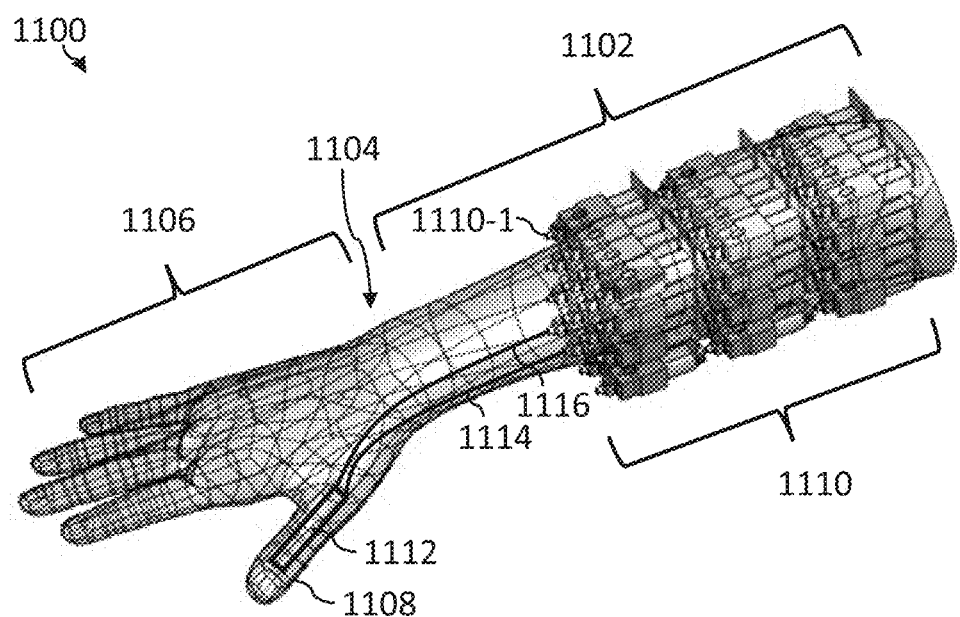
FIG. 11 is a schematic drawing of an example robotic arm with a hydraulic system.

FIG. 11 is a schematic drawing of an example implementation of a portion 1100 of a hydraulic system in a forearm 1102, wrist 1104, and hand 1106 of a robot (e.g., robot 1000 of FIG. 10), in accordance with the present systems, devices, and methods. Hand 1106 includes a digit 1108.

Forearm 1102 includes a set of valves 1110 which is integrated with forearm 1102. Valves 1110 include valve 1110-1. (Only one valve is separately labeled for clarity of illustration.) Valves 1110 may include pressure valves and exhaust valves. Valves 1110 may include electrohydraulic servo valves, and may be operated by a controller (not shown in FIG. 11).

Digit 1108 includes an actuation piston 1112 integrated with digit 1108. Actuation piston 1112 is hydraulically coupled to valves 1110 via a pressure hose 1114 and an exhaust hose 1116.

Pressure hose 1114 and exhaust hose 1116 pass through wrist 1104. Wrist 1104 can be a restricted space (as described above), and, while the diameters of hoses 1114 and 1116 may generally need to be large enough to fulfill the pressure/force requirements of portion 1100 of the hydraulic system, it can be advantageous for a respective diameter of each of hoses 1114 and 1116 to be small enough, and flexible enough, in the region of wrist 1104, to navigate wrist 1104.

Hydraulic valve 100 of FIG. 1A and/or hydraulic valve 400 of FIG. 4A can be used in portion 1100 of the hydraulic control system of FIG. 11 to control a flow of hydraulic fluid in the hydraulic control system. Hydraulic valve 100 of FIG. 1A and/or hydraulic valve 400 of FIG. 4A may be used, for example, in valves 1110. In some implementations, hydraulic valve 100 of FIG. 1A and/or hydraulic valve 400 of FIG. 4A can be used to control both pressure and exhaust flows to/from an actuation piston (e.g., actuation piston 1112).

As shown in FIG. 11, forearm 1102, wrist 1104, and hand 1106 can be restricted spaces, and there can be a large number of hydraulic connections to be made (e.g., to valves 1110). In one implementation, there are two double-acting DOFs, and consequently twenty (20) hoses running to hand 1106 to control eighteen (18) DOFs of each hand. In some implementations, there are twenty (20) one-eighth inch (⅛ in.) hoses to accommodate in forearm 1102, wrist 1104, and hand 1106.

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A hydraulic valve comprising: a valve housing; a first port; a second port; a chamber within the valve housing, the chamber which in operation is at least partially filled with a hydraulic fluid; a fluid switch within the chamber, the fluid switch movable between at least a first position and a second position, wherein: in the first position, the first port and the second port are fluidly coupled to each other through the fluid switch to allow a flow of the hydraulic fluid between the first port and the second port; and in the second position, the first port and the second port are fluidly isolated from each other by the fluid switch to restrict the flow of the hydraulic fluid between the first port and the second port, wherein at least a portion of a first external surface of the fluid switch is separated from at least a portion of a first internal surface of the chamber by a first micro-gap, and wherein at least a portion of a second external surface of the fluid switch is separated from at least a portion of a second internal surface of the chamber by a second micro-gap, the first micro-gap and the second micro-gap which are fluidly coupled to the chamber and which, in operation of the hydraulic valve, are each filled with the hydraulic fluid, the first and the second micro-gap each having a respective size of less than about five micrometers.

Example 2: A hydraulic valve according to Example 1, wherein the first port is an inlet, and the second port is an outlet, and wherein, in the first position, the inlet and the outlet are fluidly coupled to each other through the fluid switch to allow a flow of the hydraulic fluid from the inlet to the outlet.

Example 3: A hydraulic valve according to Example 1, wherein the at least a portion of the second external surface of the fluid switch is on an opposite side of the fluid switch to the at least a portion of the first external surface of the fluid switch.

Example 4: A hydraulic valve according to Example 3, wherein the first micro-gap is fluidly coupled to the second micro-gap.

Example 5: A hydraulic valve according to Example 4, wherein, in operation, a fluid pressure in the second micro-gap provides a counterbalance to a fluid pressure in the first micro-gap.

Example 6: A hydraulic valve according to Example 4, wherein the first micro-gap is fluidly coupled to the second micro-gap by a passage, the passage extending from the at least a portion of the first external surface of the fluid switch to the at least a portion of the second external surface of the fluid switch.

Example 7: A hydraulic valve according to Example 6, wherein the passage is a passage through the fluid switch.

Example 8: A hydraulic valve according to Example 1, further comprising a third port, wherein: in the first position, the third port is fluidly isolated by the fluid switch from the first port and the second port; and in the second position, the third port is fluidly coupled through the fluid switch to one of the first port and the second port.

Example 9: A hydraulic valve according to Example 8, wherein the first port is an inlet, the second port is an outlet, and the third port is fluidly coupled to a hydraulic reservoir.

Example 10: A hydraulic valve according to Example 9, wherein the hydraulic valve is operable at a fluid pressure at the inlet of at least 700 pounds per square inch (psi) (4.826 kPa).

Example 11: A hydraulic valve according to Example 10, wherein the hydraulic valve is operable at a flow rate of the hydraulic fluid from the inlet to the outlet of less than 0.5 liters per minute (lpm) when the fluid pressure at the inlet is at least 700 psi (4.826 kPa).

Example 12: A hydraulic valve according to Example 1, further comprising a third port and a fourth port, wherein: in the first position, the third port and the fourth port are fluidly isolated from each other by the fluid switch to restrict the flow of the hydraulic fluid between the third port and the fourth port; in the second position, the third port and the fourth port are fluidly coupled to each other through the fluid switch to allow a flow of the hydraulic fluid between the third port and the fourth port; and in a third position, the first port, the second port, the third port and the fourth port are fluidly isolated from one another by the fluid switch to restrict a flow of the hydraulic fluid between any ports of the first port, the second port, the third port and the fourth port.

Example 13: A hydraulic valve according to Example 12, wherein the first port is a first inlet, the second port is a first outlet, the third port is a second inlet and the fourth port is a second outlet, wherein, in the first position, the first inlet and the first outlet are fluidly coupled to each other through the fluid switch to allow a flow of the hydraulic fluid from the first inlet to the first outlet, and, in the second position, the second inlet and the second outlet are fluidly coupled to each other through the fluid switch to allow a flow of the hydraulic fluid from the second inlet to the second outlet.

Example 14: A hydraulic valve according to Example 12, further comprising a fifth port, wherein: in the first position, the fifth port is fluidly coupled through the fluid switch to one of the third port and the fourth port; and in the second position, the fifth port is fluidly coupled through the fluid switch to one of the first port and the second port.

Example 15: A hydraulic valve according to Example 14, wherein, in a fourth position, the fifth port is fluidly isolated by the fluid switch from the first port, the second port, the third port and the fourth port.

Example 16: A hydraulic valve according to Example 15, wherein the fourth position is a same position as the third position.

Example 17: A hydraulic valve according to Example 1, wherein the fluid switch comprises: at least one channel, the channel which in operation can be positioned by a first movement of the fluid switch to the first position to allow the flow of the hydraulic fluid between the first port and the second port; and at least one landing, the landing which in operation can be positioned by a second movement of the fluid switch to the second position to obstruct at least one of the first port and the second port to restrict the flow of the hydraulic fluid between the first port and the second port.

Example 18: A hydraulic valve according to Example 1, wherein the fluid switch is movable between the first position and the second position by a linear motion along an axis of translation.

Example 19: A hydraulic valve according to Example 18, wherein the fluid switch comprises a valve piston.

Example 20: A hydraulic valve according to Example 1, wherein the fluid switch is movable between the first position and the second position by a rotational motion about an axis of rotation.

Example 21: A hydraulic valve according to Example 20, wherein the fluid switch comprises a rocker.

Example 22: A hydraulic valve according to Example 1, wherein the fluid switch comprises a piezoelectric actuator, the piezoelectric actuator comprising a piezoelectric material, the piezoelectric actuator operable to receive one or more electrical signals from an electrical system, the one or more electrical signals which cause an actuation of the piezoelectric actuator by at least one of an expansion and a contraction of the piezoelectric material.

Example 23: A hydraulic valve according to Example 22, wherein the piezoelectric actuator is an amplified piezoelectric actuator.

Example 24: A hydraulic valve according to Example 22, wherein the piezoelectric actuator causes the fluid switch to move between the first position and the second position.

Example 25: A hydraulic valve according to Example 24, wherein the piezoelectric actuator causes a linear movement of the fluid switch along an axis of translation.

Example 26: A hydraulic valve according to Example 24, wherein the piezoelectric actuator causes a rotational movement of the fluid switch about an axis of rotation.

Example 27: A hydraulic valve according to Example 26, wherein the axis of rotation is a fixed axis of rotation.

Example 28: A hydraulic valve according to Example 1, wherein the valve housing includes, or is manufactured from, aluminum.

Example 29: A hydraulic valve according to Example 1, wherein at least a portion of the valve housing is formed by one of an assembly from multiple elements, a casting, a mold, a 3D-printing, or a machining.

Example 30: A hydraulic valve according to Example 1, wherein each of the first port and the second port comprise a respective through-hole and a respective hydraulic fitting, the hydraulic fitting fluidly coupleable to a hydraulic hose.

Example 31: A hydraulic valve according to Example 1, wherein the hydraulic fluid is an oil.

Example 32: A hydraulic valve according to Example 1, wherein the fluid switch includes, or is manufactured from, brass.

Example 33: A robot comprising: a robot body; a hydraulic control system physically coupled to the robot body; a hydraulically-actuated component physically coupled to the robot body, the hydraulically-actuated component operable to cause a motion of at least a portion of the robot; and a hydraulic valve comprising: a valve housing; a first port; a second port; a chamber within the valve housing, the chamber which in operation is at least partially filled with a hydraulic fluid; a fluid switch within the chamber, the fluid switch movable between at least a first position and a second position, wherein: in the first position, the first port and the second port are fluidly coupled to each other through the fluid switch to allow a flow of the hydraulic fluid between the first port and the second port; and in the second position, the first port and the second port are fluidly isolated from each other by the fluid switch to restrict the flow of the hydraulic fluid between the first port and the second port, wherein at least a portion of a first external surface of the fluid switch is separated from at least a portion of a first internal surface of the chamber by a first micro-gap, and wherein at least a portion of a second external surface of the fluid switch is separated from at least a portion of a second internal surface of the chamber by a second micro-gap, the first micro-gap and the second micro-gap which are fluidly coupled to the chamber and which, in operation of the hydraulic valve, are each filled with the hydraulic fluid, the first and the second micro-gap each having a respective size of less than about five micrometers.

Example 34: A robot according to Example 33, wherein the hydraulic control system comprises: an accumulator; a hydraulic pump; and a reservoir, wherein the hydraulic valve is operable to control at least one of a pressure or an exhaust of the hydraulically-actuated component.

Example 35: A robot according to Example 33, wherein the fluid switch comprises a piezoelectric actuator, and the robot further comprises an electrical system, the electrical system electrically communicatively coupled to the fluid switch, the electrical system operable to transmit an electrical signal to the piezoelectric actuator of the fluid switch to cause the fluid switch to move between the first position and the second position.

Example 36: A robot according to Example 33, wherein the hydraulically-actuated component is an actuation piston.

Example 37: A hydraulic valve comprising: a valve housing comprising a first inner surface and a second inner surface in opposing relation, a chamber disposed between the first inner surface and the second inner surface, a first port connected to the chamber, and a second port connected to the chamber; a fluid switch disposed within the chamber, the fluid switch comprising a first external surface adjacent to the first inner surface and a second external adjacent to the second inner surface, wherein the fluid switch is movable between a first position in which the fluid switch fluidly connects the first port to the second port via a first flow path extending through the fluid switch and a second position in which the fluid switch fluidly disconnects the first port from the second port; and a fluid bearing arranged in the chamber to support movement of the fluid switch, the fluid bearing comprising a first micro-gap separating the first inner surface from the first external surface, a second micro-gap separating the second inner surface from the second external surface, and a hydraulic fluid disposed in the first micro-gap and the second micro-gap.

Example 38: A hydraulic valve according to Example 37, wherein the first micro-gap and the second micro-gap are fluidly coupled through at least one passage formed in the fluid switch.

Example 39: A hydraulic valve according to Example 37, wherein the first port has a first opening formed in the first inner surface, wherein the valve housing further comprises a first cavity formed in the second inner surface in a position opposite to the first opening, and wherein the first cavity is fluidly coupled to the first port.

Example 40: A hydraulic valve according to Example 37, wherein a size of each of the first micro-gap and the second micro-gap is less than 5 micrometers.

Example 41: A hydraulic valve according to Example 37, wherein the valve housing is planar.

Example 42: A hydraulic valve according to Example 37, wherein the valve housing comprises a third port and a fourth port connected to the chamber, wherein in the first position the fluid switch fluidly connects the third port to the fourth port via a second flow path extending through the fluid switch, and wherein in the second position the fluid switch disconnects the third port from the fourth port and connects the second port to the third port via a third flow path extending through the fluid switch.

Example 43: A hydraulic valve according to Example 42, wherein the valve housing comprises a fifth port connected to the chamber, wherein in the first position the fluid switch fluidly isolates the fifth port from the other ports, and wherein in the second position the fluid switch connects the fifth port to the fourth port via a fourth flow path extending through the fluid switch.

Example 44: A hydraulic valve according to Example 43, wherein the first port, the third port, and the fifth port are connected to the chamber at the first inner surface, and wherein the second port and the fourth port are connected to the chamber at the second inner surface.

Example 45: A hydraulic valve according to Example 42, wherein the fluid switch comprises a first channel and a second channel extending from the first external surface to the second external surface, wherein the first flow path, the second flow path, and the third flow path are formed in the first channel, and wherein the fourth flow is formed in the second channel.

Example 46: A hydraulic valve according to Example 37, further comprising an actuator coupled to the fluid switch and operable to move the fluid switch between the first position and the second position.

Example 47: A hydraulic valve according to Example 46, wherein the actuator is a linear actuator operable to move the fluid switch along a linear axis of the chamber.

Example 48: A hydraulic valve according to Example 47, wherein the actuator is a piezo actuator.

Example 49: A hydraulic valve according to Example 46, wherein the actuator is coupled to the fluid switch through a pivot joint, and wherein the actuator is operable to rotate the fluid switch about the pivot joint.

Example 50: A hydraulic valve according to Example 49, wherein the actuator is disposed within a cavity formed in the valve housing.

Example 51: A hydraulic system, comprising: a hydraulic actuator; a hydraulic pump; a reservoir; and a hydraulic valve comprising: a valve housing comprising a first inner surface and a second inner surface in opposing relation, a chamber disposed between the first inner surface and the second inner surface, a first port connected to the chamber, and a second port connected to the chamber, wherein the first port is fluidly connected to the hydraulic pump and the second port is fluidly connected to the reservoir; a fluid switch disposed within the chamber, the fluid switch comprising a first external surface adjacent to the first inner surface and a second external adjacent to the second inner surface, wherein the fluid switch is movable between a first position in which the fluid switch fluidly connects the first port and the second port via a first flow path extending through the fluid switch and a second position in which the fluid switch fluidly disconnects the first port from the second port; and a fluid bearing arranged in the chamber to support movement of the fluid switch, the fluid bearing comprising a first micro-gap separating the first inner surface from the first external surface, a second micro-gap separating the second inner surface from the second external surface, and a hydraulic fluid disposed in the first micro-gap and the second micro-gap.

Example 52: A hydraulic system according to Example 51, further comprising a valve actuator coupled to the fluid switch and operable to move the fluid switch between the first position and the second position.

Example 53: A hydraulic system according to Example 52, wherein the valve actuator is a piezo actuator.

Example 54: A hydraulic system according to Example 51, wherein a size of each of the first micro-gap and the second micro-gap is less than 5 micrometers.

Example 55: A hydraulic system according to Example 51, wherein the first micro-gap and the second micro-gap are fluidly coupled through at least one passage formed in the fluid switch.

Example 56: A robot comprising: a robot body; a robotic hand coupled to the robot body, the robotic hand having a first digit; a hydraulic actuator coupled to the robotic hand and operably coupled to the first digit; a hydraulic system comprising a hydraulic pump, a reservoir, and a hydraulic valve, wherein the hydraulic valve comprises: a valve housing comprising a first inner surface and a second inner surface in opposing relation, a chamber disposed between the first inner surface and the second inner surface, a first port connected to the chamber, and a second port connected to the chamber, wherein the first port is fluidly connected to the hydraulic pump and the second port is fluidly connected to the reservoir; a fluid switch disposed within the chamber, the fluid switch comprising a first external surface adjacent to the first inner surface and a second external adjacent to the second inner surface, wherein the fluid switch is movable between a first position in which the fluid switch fluidly connects the first port and the second port via a first flow path extending through the fluid switch and a second position in which the fluid switch fluidly disconnects the first port from the second port; and a fluid bearing arranged in the chamber to support movement of the fluid switch, the fluid bearing comprising a first micro-gap separating the first inner surface from the first external surface, a second micro-gap separating the second inner surface from the second external surface, and a hydraulic fluid disposed in the first micro-gap and the second micro-gap.

The invention claimed is:

1. A hydraulic valve comprising:
a valve housing comprising a first plate member having a first inner surface and a second plate member having a second inner surface arranged in opposing relation to the first inner surface, a chamber disposed between the first inner surface and the second inner surface, a first port formed in the first plate member and connected to the chamber, and a second port formed in the second plate member and connected to the chamber, wherein the first and second ports are accessible from outside the valve housing;
a fluid switch disposed within the chamber, the fluid switch comprising a first external surface adjacent to the first inner surface, a second external surface adjacent to the second inner surface, and a first internal channel having openings at the first external surface and the second external surface, wherein the fluid switch is movable between a first position in which the fluid switch fluidly connects the first port to the second port via a first flow path extending through the first internal channel of the fluid switch and a second position in which the fluid switch fluidly disconnects the first port from the second port; and
a fluid bearing arranged in the chamber to support movement of the fluid switch, the fluid bearing comprising a first micro-gap separating the first inner surface from the first external surface in any position of the fluid switch within the chamber, a second micro-gap separating the second inner surface from the second external surface in any position of the fluid switch within the chamber, a first hydraulic fluid layer disposed in the first micro-gap, and a second hydraulic fluid layer disposed in the second micro-gap, wherein a size of each of the first micro-gap and the second micro-gap is less than 5 micrometers;
wherein the valve housing comprises a third port and a fourth port connected to the chamber, wherein the third port is formed in the first plate member, wherein the fourth port is formed in the second plate member, wherein in the first position the fluid switch fluidly connects the third port to the fourth port via a second flow path extending through the fluid switch, and wherein in the second position the fluid switch disconnects the third port from the fourth port and connects the second port to the third port via a third flow path extending through the fluid switch.

2. The hydraulic valve of claim 1, wherein the first micro-gap and the second micro-gap are fluidly coupled through at least one passage formed in the fluid switch.

3. The hydraulic valve of claim 1, wherein the first port has a first opening formed in the first inner surface, wherein the valve housing further comprises a first cavity formed in the second inner surface in a position opposite to the first opening, and wherein the first cavity is fluidly coupled to the first port.

4. The hydraulic valve of claim 1, wherein the size of each of the first micro-gap and the second micro-gap is approximately 0.5 micrometers or less.

5. The hydraulic valve of claim 1, wherein the valve housing is planar.

6. The hydraulic valve of claim 1, wherein the valve housing comprises a fifth port connected to the chamber, wherein the fifth port is formed in the first plate member, wherein in the first position the fluid switch fluidly isolates the fifth port from the other ports, and wherein in the second position the fluid switch connects the fifth port to the fourth port via a fourth flow path extending through the fluid switch.

7. The hydraulic valve of claim 6, wherein the first port, the third port, and the fifth port are connected to the chamber at the first inner surface, and wherein the second port and the fourth port are connected to the chamber at the second inner surface.

8. The hydraulic valve of claim 1, wherein the fluid switch further comprises a second internal channel having openings at the first external surface and the second external surface, wherein the first flow path, the second flow path, and the third flow path are formed in the first internal channel, and wherein the fourth flow path is formed in the second internal channel.

9. The hydraulic valve of claim 1, further comprising an actuator coupled to the fluid switch and operable to move the fluid switch between the first position and the second position.

10. The hydraulic valve of claim 9, wherein the actuator is a linear actuator operable to move the fluid switch along a linear axis of the chamber.

11. The hydraulic valve of claim 10, wherein the actuator is a piezo actuator.

12. The hydraulic valve of claim 9, wherein the actuator is coupled to the fluid switch through a pivot joint, and wherein the actuator is operable to rotate the fluid switch about the pivot joint.

13. The hydraulic valve of claim 12, wherein the actuator is disposed within a cavity formed in the valve housing.

14. A hydraulic system, comprising:
a hydraulic actuator;
a hydraulic pump;
a reservoir; and
a hydraulic valve comprising:
  a valve housing comprising a first plate member having a first inner surface and a second plate member having a second inner surface arranged in opposing relation to the first inner surface, a chamber disposed between the first inner surface and the second inner surface, a first port formed in the first plate member and connected to the chamber, and a second port formed in the second plate member and connected to the chamber, wherein the first and second ports are accessible from outside the valve housing, wherein the first port is fluidly connected to the hydraulic pump and the second port is fluidly connected to the reservoir;
  a fluid switch disposed within the chamber, the fluid switch comprising a first external surface adjacent to the first inner surface, a second external surface adjacent to the second inner surface, and a first internal channel having openings at the first external surface and the second external surface, wherein the fluid switch is movable between a first position in which the fluid switch fluidly connects the first port to the second port via a first flow path extending through the first internal channel of the fluid switch and a second position in which the fluid switch fluidly disconnects the first port from the second port; and
  a fluid bearing arranged in the chamber to support movement of the fluid switch, the fluid bearing comprising a first micro-gap separating the first inner surface from the first external surface in any position of the fluid switch within the chamber, a second micro-gap separating the second inner surface from the second external surface in any position of the fluid switch within the chamber, a first hydraulic fluid layer disposed in the first micro-gap, and a second hydraulic fluid layer disposed in the second micro-gap, wherein a size of each of the first micro-gap and the second micro-gap is less than 5 micrometers;
wherein the valve housing comprises a third port and a fourth port connected to the chamber, wherein the third port is formed in the first plate member, wherein the fourth port is formed in the second plate member, wherein in the first position the fluid switch fluidly connects the third port to the fourth port via a second flow path extending through the fluid switch, and wherein in the second position the fluid switch disconnects the third port from the fourth port and connects the second port to the third port via a third flow path extending through the fluid switch.

15. The hydraulic system of claim 14, further comprising a valve actuator coupled to the fluid switch and operable to move the fluid switch between the first position and the second position.

16. The hydraulic system of claim 15, wherein the valve actuator comprises a piezo actuator.

17. The hydraulic system of claim 14, wherein the size of each of the first micro-gap and the second micro-gap is approximately 0.5 micrometers or less.

18. The hydraulic system of claim 14, wherein the first micro-gap and the second micro-gap are fluidly coupled through at least one passage formed in the fluid switch.

19. A robot comprising:
a robot body;
a robotic hand coupled to the robot body, the robotic hand having a first digit;
a hydraulic actuator coupled to the robotic hand and operably coupled to the first digit;
a hydraulic system comprising a hydraulic pump, a reservoir, and a hydraulic valve, wherein the hydraulic valve comprises:
  a valve housing comprising a first plate member having a first inner surface and a second plate member having a second inner surface arranged in opposing relation to the first inner surface, a chamber disposed between the first inner surface and the second inner surface, a first port formed in the first plate member and connected to the chamber, and a second port formed in the second plate member and connected to the chamber, wherein the first and second ports are accessible from outside the valve housing, wherein the first port is fluidly connected to the hydraulic pump and the second port is fluidly connected to the reservoir;

a fluid switch disposed within the chamber, the fluid switch comprising a first external surface adjacent to the first inner surface and a second external surface adjacent to the second inner surface, and a first internal channel having openings at the first external surface and the second external surface, wherein the fluid switch is movable between a first position in which the fluid switch fluidly connects the first port to the second port via a first flow path extending through the first internal channel of the fluid switch and a second position in which the fluid switch fluidly disconnects the first port in from the second port; and a fluid bearing arranged in the chamber to support movement of the fluid switch, the fluid bearing comprising a first micro-gap separating the first inner surface from the first external surface in any position of the fluid switch, a second micro-gap separating the second inner surface from the second external surface in any position of the fluid switch, a first hydraulic fluid layer disposed in the first micro-gap, and a second hydraulic fluid layer disposed in the second micro-gap, wherein a size of each of the first micro-gap and the second micro-gap is less than 5 micrometers;

wherein the valve housing comprises a third port and a fourth port connected to the chamber, wherein the third port is formed in the first plate member, wherein the fourth port is formed in the second plate member, wherein in the first position the fluid switch fluidly connects the third port to the fourth port via a second flow path extending through the fluid switch, and wherein in the second position the fluid switch disconnects the third port from the fourth port and connects the second port to the third port via a third flow path extending through the fluid switch.

* * * * *